US006662999B1

(12) United States Patent
Vancour et al.

(10) Patent No.: US 6,662,999 B1
(45) Date of Patent: Dec. 16, 2003

(54) SYSTEM AND METHOD FOR GENERATING AN IDENTIFICATION CARD

(75) Inventors: Karen Ann Vancour, Barkhamsted, CT (US); Paul G. Grennan, Tolland, CT (US)

(73) Assignee: Connecticut General Life Insurance, Co., Bloomfield, CT (US)

( * ) Notice: Subject to any disclaimer, the term of this patent is extended or adjusted under 35 U.S.C. 154(b) by 0 days.

(21) Appl. No.: 10/083,033

(22) Filed: Feb. 26, 2002

(51) Int. Cl.[7] .............................................. G06F 17/00
(52) U.S. Cl. ...................................... 235/375; 235/381
(58) Field of Search ................................. 235/375, 381, 235/379, 380, 382, 383, 487, 486; 705/41, 44, 13; 283/114, 75

(56) References Cited

U.S. PATENT DOCUMENTS

| | | | | |
|---|---|---|---|---|
| 4,504,083 A | * | 3/1985 | Devrient et al. ............... 283/77 |
| 4,837,422 A | * | 6/1989 | Dethloff et al. .............. 235/380 |
| 4,968,873 A | * | 11/1990 | Dethloff et al. .............. 235/380 |
| 5,146,499 A | * | 9/1992 | Geffrotin ...................... 713/172 |
| 5,889,941 A | * | 3/1999 | Tushie et al. ................. 713/200 |
| 6,003,014 A | * | 12/1999 | Lee et al. ........................ 705/13 |
| 6,014,748 A | * | 1/2000 | Tushie et al. ................. 713/200 |
| 6,018,717 A | * | 1/2000 | Lee et al. ........................ 705/13 |
| 6,196,459 B1 | * | 3/2001 | Goman et al. ............... 235/380 |
| 6,202,155 B1 | * | 3/2001 | Tushie et al. ................. 713/200 |
| 6,220,511 B1 | * | 4/2001 | Holec et al. .................. 235/380 |
| 6,335,799 B1 | * | 1/2002 | Provost ......................... 358/1.4 |
| 6,357,665 B1 | * | 3/2002 | Peachman et al. ........... 235/492 |

* cited by examiner

Primary Examiner—Thien M. Le
(74) Attorney, Agent, or Firm—Morgan, Lewis & Bockius, L.L.P.

(57) ABSTRACT

An identification card documentation data file is generated that is representative of a high volume batch of identification cards. Content information, including information regarding providers, eligibility, the client, benefits and business rules, is used, along with format information, to create the data file.

26 Claims, 33 Drawing Sheets

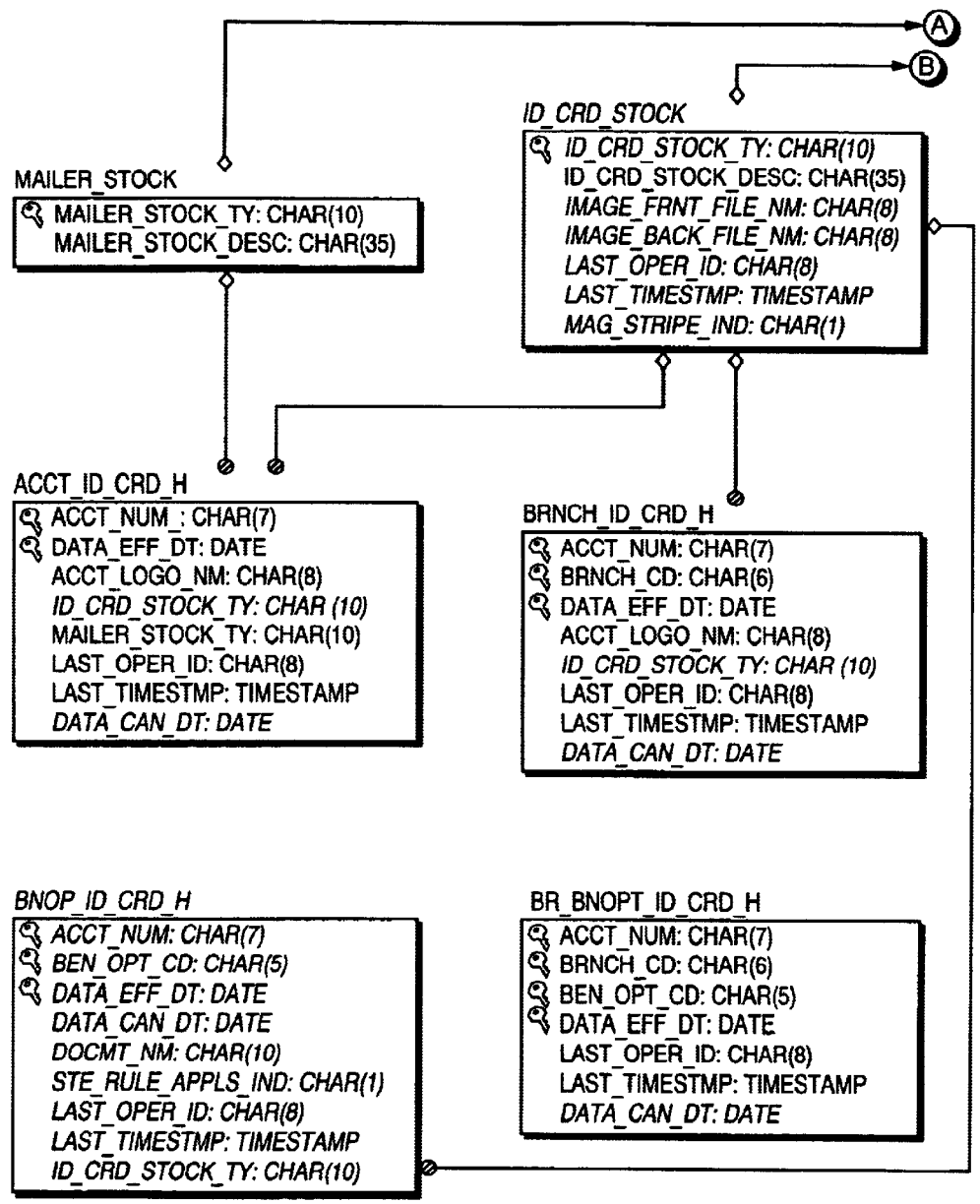
FIG. 1B1

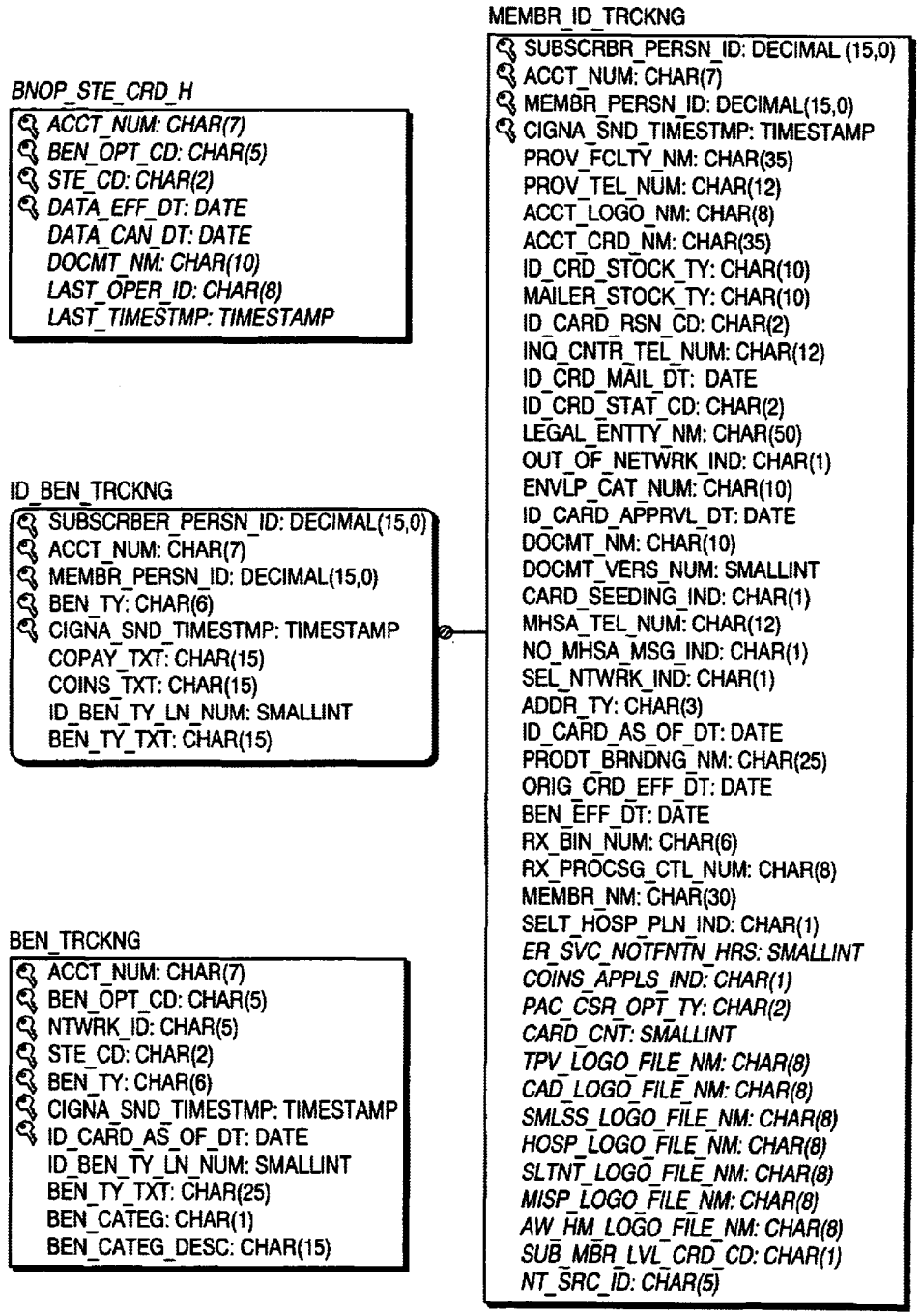
FIG. 1B2

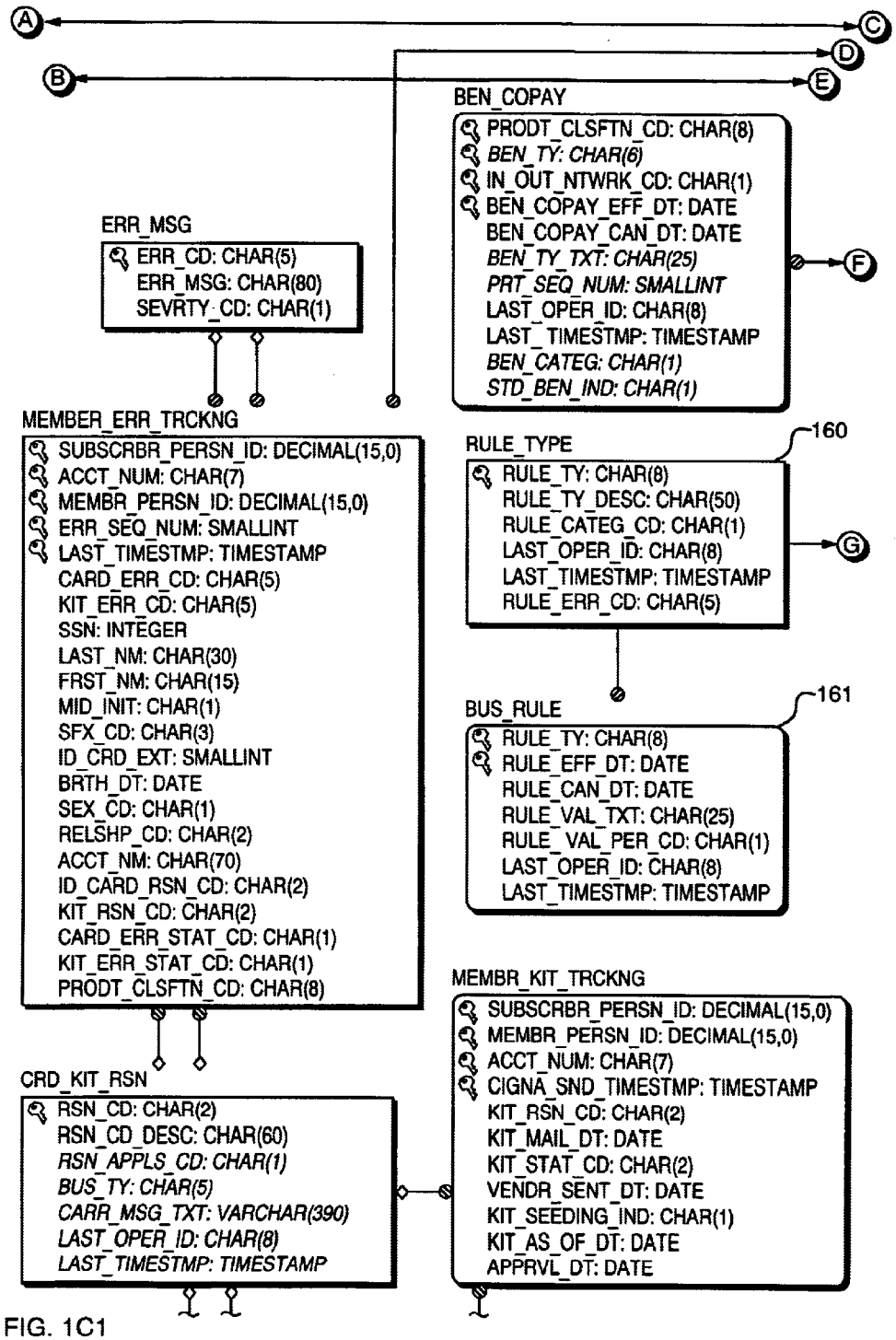
FIG. 1C1

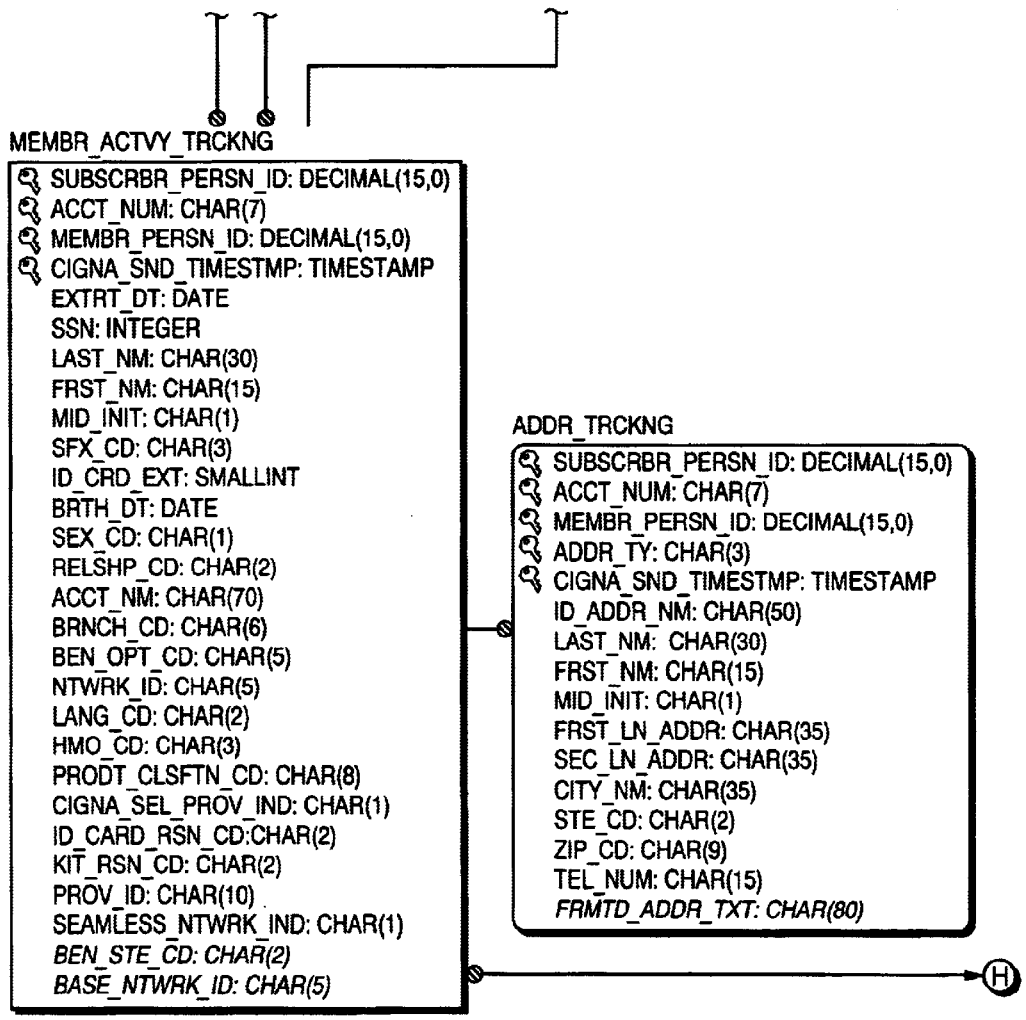
FIG. 1C2

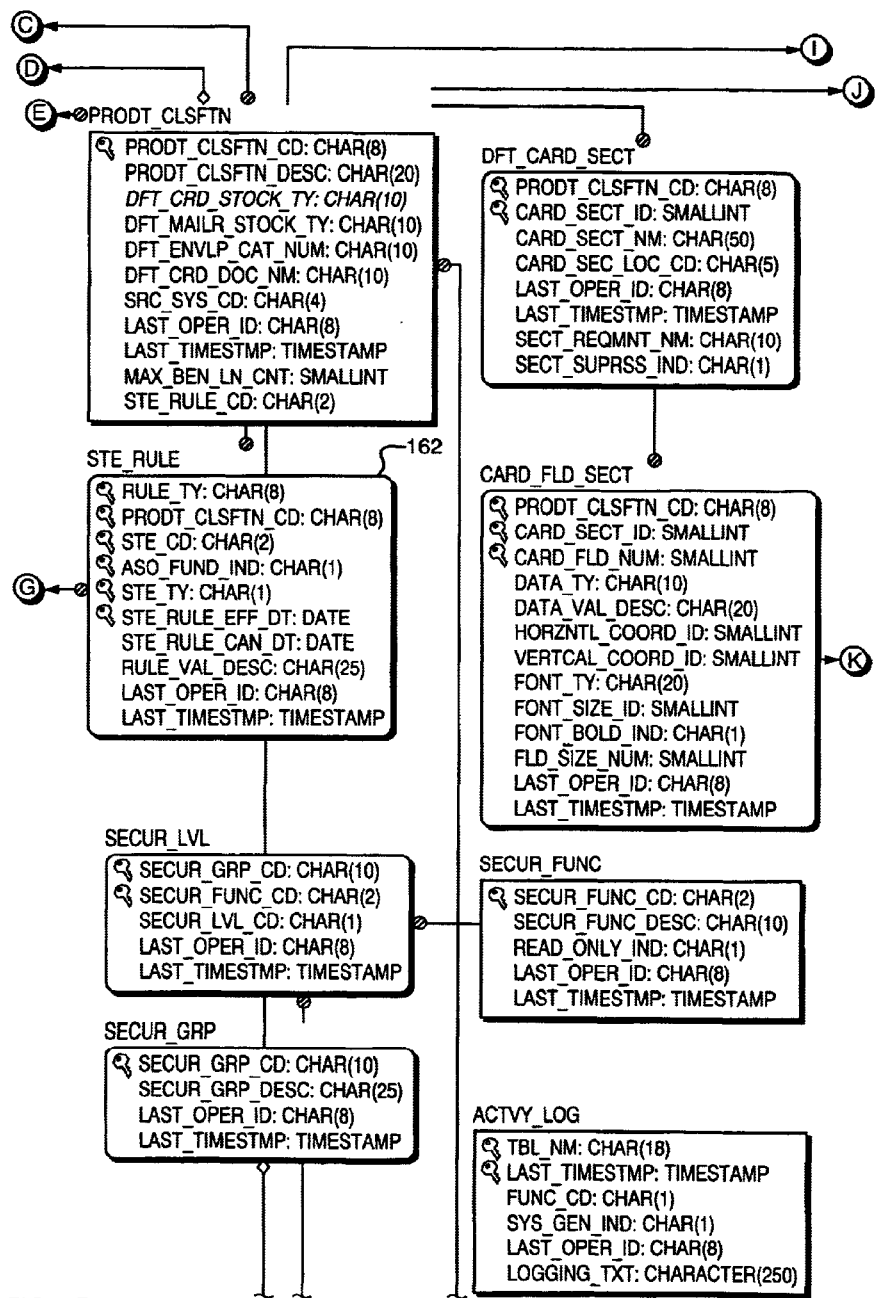
FIG. 1D1

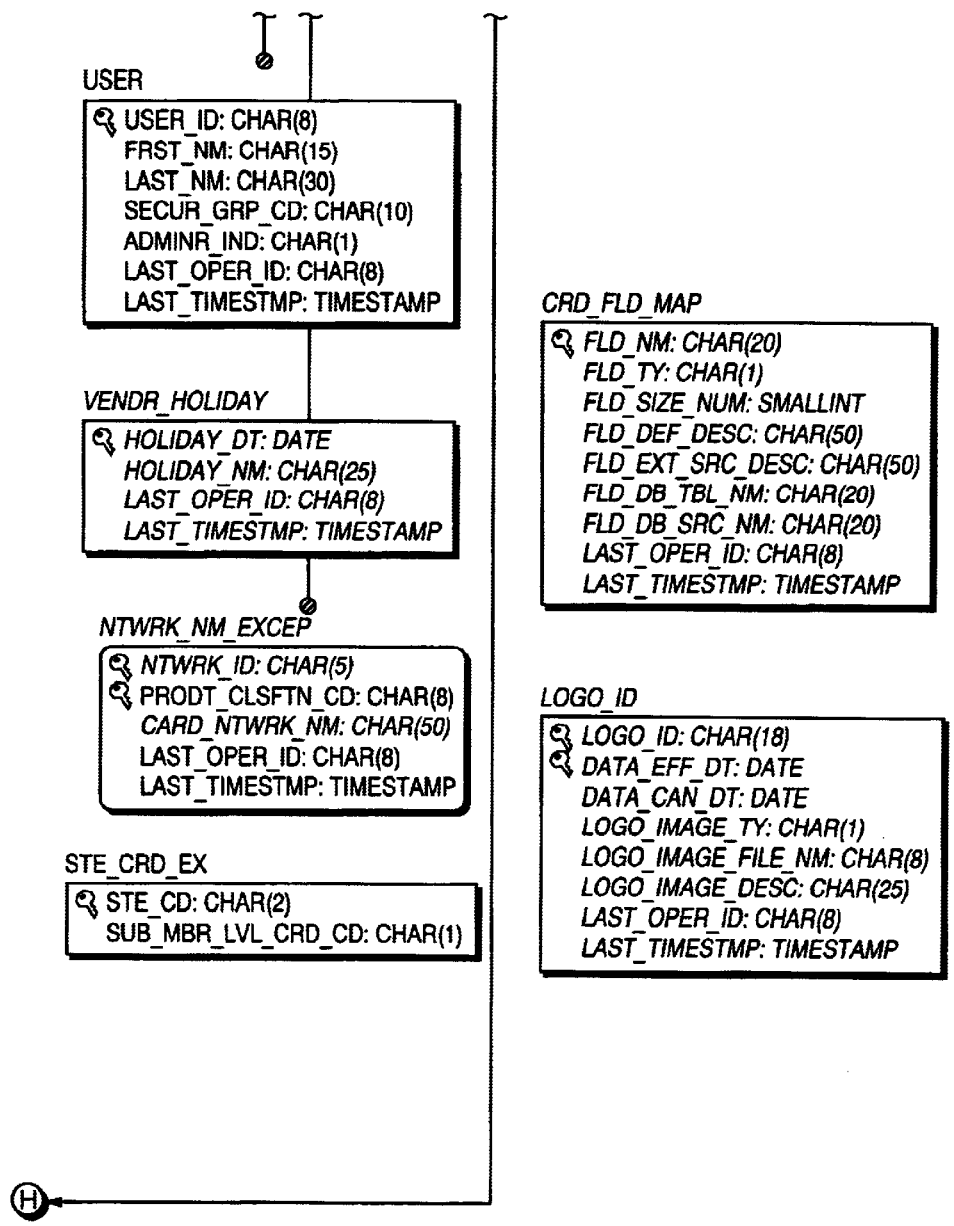
FIG. 1D2

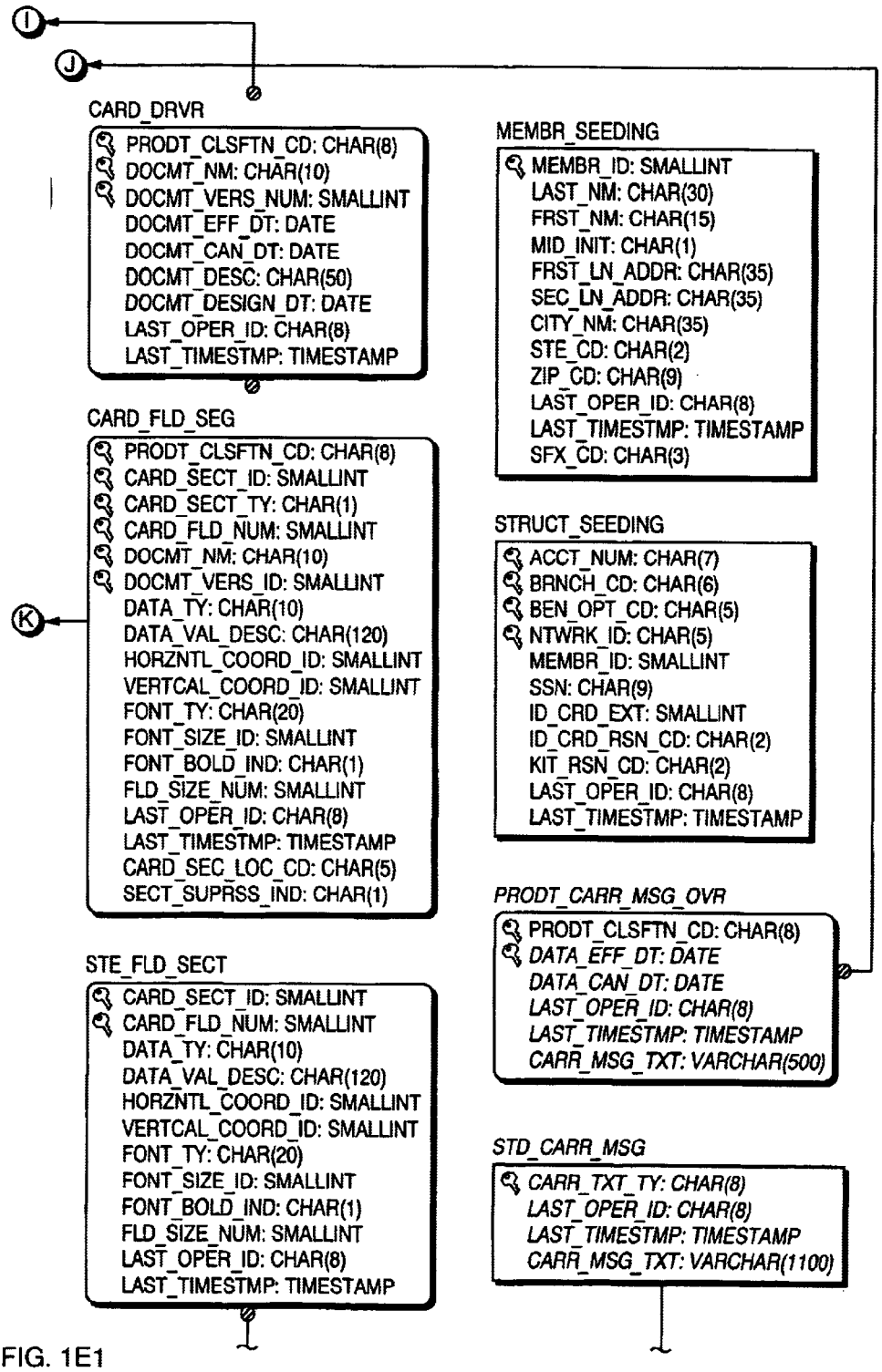
FIG. 1E1

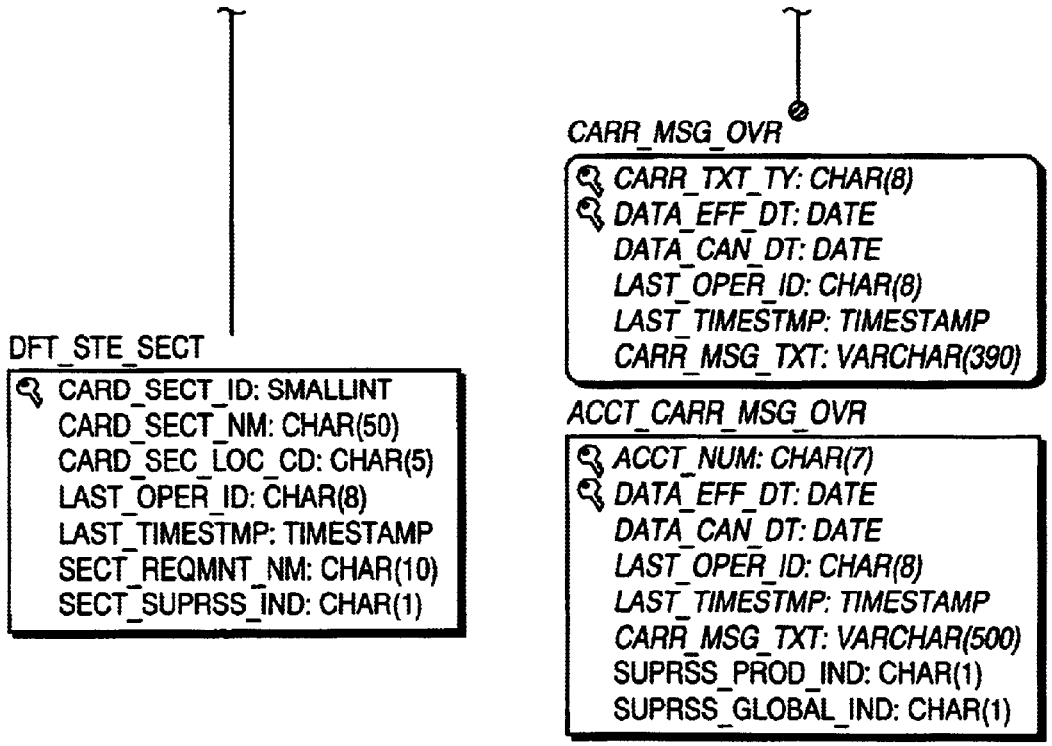
FIG. 1E2

Member Information
   Social Security Number
   ID card extension
   Effective date
   Cancel date
   Account
   Branch
   Benefit Option
   Name
   Address
   Birth Date
   Sex
   PCP
   PCP effective date
   PCP end date
   HMO
   Network
   Network dates
   Medical Record Number
   COBRA information
Subscriber Information
   Name
   Address

FIG. 2A

Account Information
   Number
   Name
   Effective date
   Benefit option code
   Network ID
   Branch/Benefit Option/Network effective date
   Branch/Benefit Option/Network cancel date
   Product Type
   Claim System Code
   Call Center Location Code
   Branch/Benefit Option ID Card Indicator
   Account ID Card hold reason code
   Account ID Card hold reason date
   Account ID Card release date
   Account/Branch ID Card hold reason code
   Account/Branch ID Card hold date
   Account/Branch ID Card release date
   Account/Benefit Option ID Card hold date
   Account/Benefit Option ID Card hold reason code
   Account/Benefit Option ID Card release date

FIG. 2D

Provider Information
   Name
   Telephone number
   Individual / Group Identifier
   Effective date
   End date
   Address
   EMS Group Name
   EMS address
   Staff/PA Identifier
   Network within a network identifier
   Seamless network identifier
   State codes covered by the seamless network

FIG. 2B

Co-Pay Type
   PCP office visit
   Specialist office visit
   Hospital emergency room
   Pharmacy
      Coinsurance
      Copay
      Brand
      Generic
   Urgent Card
   Vision
   Diabetic Supply
Co-pay amount
MH/SA benefit indicator
MHSA carve-out

FIG. 2C

- Account benefit option effective date must not be greater than two months from today
- A member's benefit option effective date must not be greater than two months from today
- A member's branch effective date must not be greater than two months from today
- A member's PCP effective date must not be greater than two months from today
- A member's network cancel date must not be greater than twenty days from today
- A member's branch cancel date must not be greater than twenty days from today
- A member's benefit option cancel date must not be greater than twenty days from today
- A member's PCP cancel date must not be greater than twenty days from today

FIG. 3A

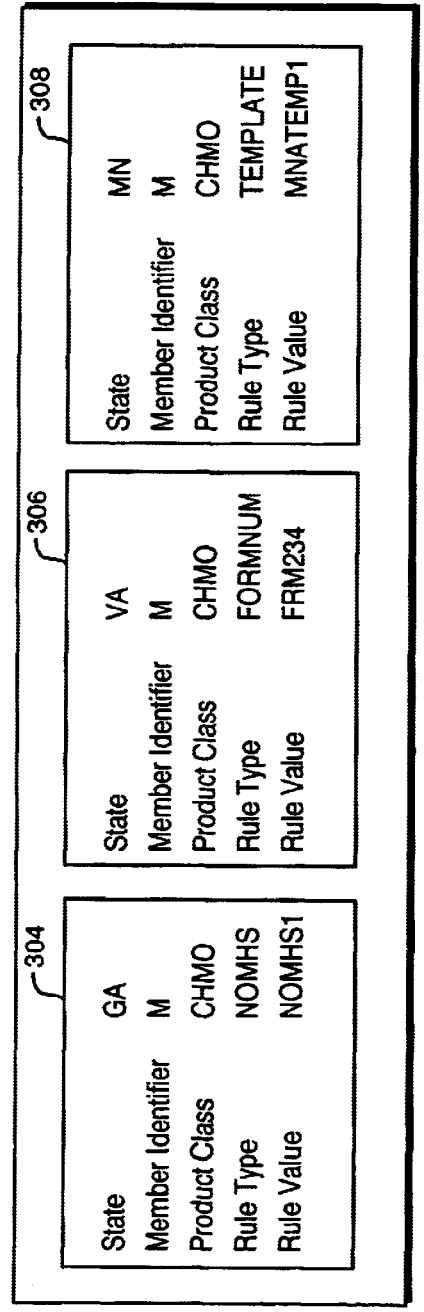

| 304 | | 306 | | 308 | |
|---|---|---|---|---|---|
| State | GA | State | VA | State | MN |
| Member Identifier | M | Member Identifier | M | Member Identifier | M |
| Product Class | CHMO | Product Class | CHMO | Product Class | CHMO |
| Rule Type | NOMHS | Rule Type | FORMNUM | Rule Type | TEMPLATE |
| Rule Value | NOMHS1 | Rule Value | FRM234 | Rule Value | MNATEMP1 |

Seeded List

| Account | Branch | Ben Opt | Network | SSN | Last Name | First Name | MI | City |
|---------|--------|---------|---------|-----|-----------|------------|----|----|
| 0000009 | 000001 | BASE | ... | | Gaetani | Joseph | A | Anywhere |
| 0000009 | 000001 | BASE | ... | | Gaetani | Joseph | A | Anywhere |
| 0821001 | 000011 | CHA3 | None | | Gaetani | Joseph | A | Anywhere |
| 0821001 | 000011 | POS | VA402 | | Gaetani | Joseph | A | Anywhere |
| 0828001 | 000012 | CHA1 | CA803 | | Belser | Lulu | Q | City |
| 2002008 | 3333 | CAT | NY901 | | Belser | Lulu | Q | City |
| 2002010 | 99 | GRBAY | AZ801 | | Gaetani | Joseph | A | Anywhere |
| 2003004 | 100 | CHADD | None | | Belser | Lurle | Q | City |
| 2003004 | 200 | HMOBD | None | | Gaetani | Joseph | A | Anywhere |
| 2003005 | 0100 | CHA | None | | Winkle | Tom | A | Spfld |

[ Delete ]  [ Exit ]  [ Print ]  [ Account Seeding Screen ]

SYSTEM AND METHOD FOR GENERATING AN IDENTIFICATION CARD

FIELD OF THE INVENTION

The present invention relates to a system and method for generating identification cards.

BACKGROUND OF THE INVENTION

Most providers of insurance coverage or benefits issue identification cards to members/employees of contracting organizations to identify members that are eligible for coverage or benefits. This is particularly true for health care and dental benefits providers. The identification cards are used by the providers of coverage or benefits to identify membership, facilitate access to care, provide information about health care coverage, allow branding and recognize health care providers.

In order to create the identification cards, a system operator affiliated with the provider extracts member eligibility information and business rules from multiple databases and transmits the information to identification card vendors for card generation using multiple systems. Each identification card system includes its own business rules that provide instruction as to how to generate the identification cards. Business rules for creating identification cards among the identification card systems may be different. Examples of business rules include the amount the members of a particular contracting organization pay to health care providers for each office visit, certain disclaimers and text required by certain states or the provider.

To create a batch of identification cards for each contracting organization, the system operator synchronizes the appropriate business rules from each identification card system and chooses a font type and an identification card stock. Some providers have thousands of different font types and hundreds of different card stocks from which to choose. Moreover, the card design for each contracting organization may be unique based on the agreement between the contracting organization and the provider.

Upon selecting the font type and identification card stock, the system operator transmits to the vendor multiple files along with the business rules associated with each particular contracting organization. In some cases, errors may be generated during the transmission and/or the vendor may not receive some files. Thus, each vendor must manually reconcile all files received. The system operator must also design the graphics for each card and transmit the graphics to the vendor. Some contracting organizations have multiple graphic designs. Typically, vendors charge the provider for each design required. Upon receiving the files, the vendor determines how to program into the vendor's system the graphics, business rules, font types and other information contained in the files. The vendor may create a paper copy of an identification card for each contracting organization that is faxed to the provider for review. Upon final approval from the provider, the vendor creates a batch of identification cards for each contracting organization by implementing the appropriate program(s). The vendor mails the batch to the organization or the individual members.

Apart from the cumbersome and inefficient process of faxing a paper copy of the identification card to the provider, this system and procedure does not allow the provider to view an image of the identification card prior to its being distributed. This system and procedure also forecloses the possibility of accessing the data representing the identification card electronically, such as over a global communications network or by a voice response unit. Furthermore, the provider is forced to rely on vendors for a key customer deliverable (i.e., the identification card).

Additionally, in order for the contracting organization to obtain customized identification cards (such as identification cards with the contracting organization's logo), the identification card vendor must program each customization into the vendor's system. Thereafter, the vendor must implement a customization program to print the customized identification cards for members of the contracting organization. Moreover, in the event a change must be made to an organization's identification cards, for certain types of changes, the provider must inform the vendor of the change and the vendor must then determine how to program and implement the change in their system. For example, if the provider wants to change the amount that members pay for office visits, the provider must inform the vendor of the new amount and the vendor must program the new amount and create the new cards by implementing a change in programming.

In this environment, there is a relatively high level of complexity in performing relatively minor changes, such as changing the physical placement of data items on the identification cards. Thus, for future use, providers may store multiple versions of physical identification cards that represent previously created cards. However, this is expensive and inefficient.

For these reasons, identification card production processes are manually intensive, inefficient and prone to misinterpretation and/or errors. Such problems cause about two and a half percent of all cards to be destroyed and reissued each year. Therefore, the provider may spend a great deal of money and research time trying to determine, among other things, why a card did not get generated properly.

A currently available document generation system enables a programmer associated with the provider, rather than the outside vendor, to perform the programming. However, this system is relatively expensive since it requires a highly skilled programmer to be involved in implementing each batch of identification cards. The skilled programmer must also be involved in implementing relatively minor changes to existing cards and customizations of new cards. Moreover, this document generation system is incapable of creating a large volume of cards and is not useful to large providers. Also, the document generation system does not allow each identification card to be viewed prior to printing.

What is needed therefore, is a simplified identification card system for generating identification cards. The system must also be capable of being used with other electronic alternatives to reduce dependency on physical identification cards. The system must significantly increase the accuracy of identification card creation and minimize the cost associated with creating identification cards.

SUMMARY OF THE INVENTION

The present invention solves the problems associated with prior art identification card generation systems by providing a system and method for generating an identification card documentation data file representative of a high volume batch of identification card documentation items. Identification card documentation format information that corresponds to positioning of the identification card documentation content information on each of the identification cards in the batch is defined. Identification card documentation content information is extracted from one or more databases that include provider information, eligibility information, client information, benefits information and business rules. The identification card documentation data file is generated based on the identification card documentation content information and the identification card documentation format information.

Additional features and advantages of the invention will be set forth in the description that follows, and in part will be apparent from the description, or may be learned by practice of the invention. The objectives and advantages of the invention will be realized and attained by the system particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIGS. 1B–1E illustrate a preferred embodiment of a data model that may be used to organize data used in connection with the implementation of the present invention.

FIGS. 2A–2D provide examples of information stored in certain databases of a preferred embodiment of the system of the present invention.

FIGS. 3A and 3B provide examples of rules that may be used in connection with implementing a preferred embodiment of the present invention.

FIGS. 4A–4J illustrate screens of an exemplary user interface used in connection with the present invention.

FIGS. 6A–6D illustrate screens of an exemplary user interface used in connection with the present invention.

FIGS. 7A–7C illustrate screens of an exemplary user interface used in connection with the present invention.

DESCRIPTION OF THE PREFERRED EMBODIMENTS

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements.

Figure 1A:
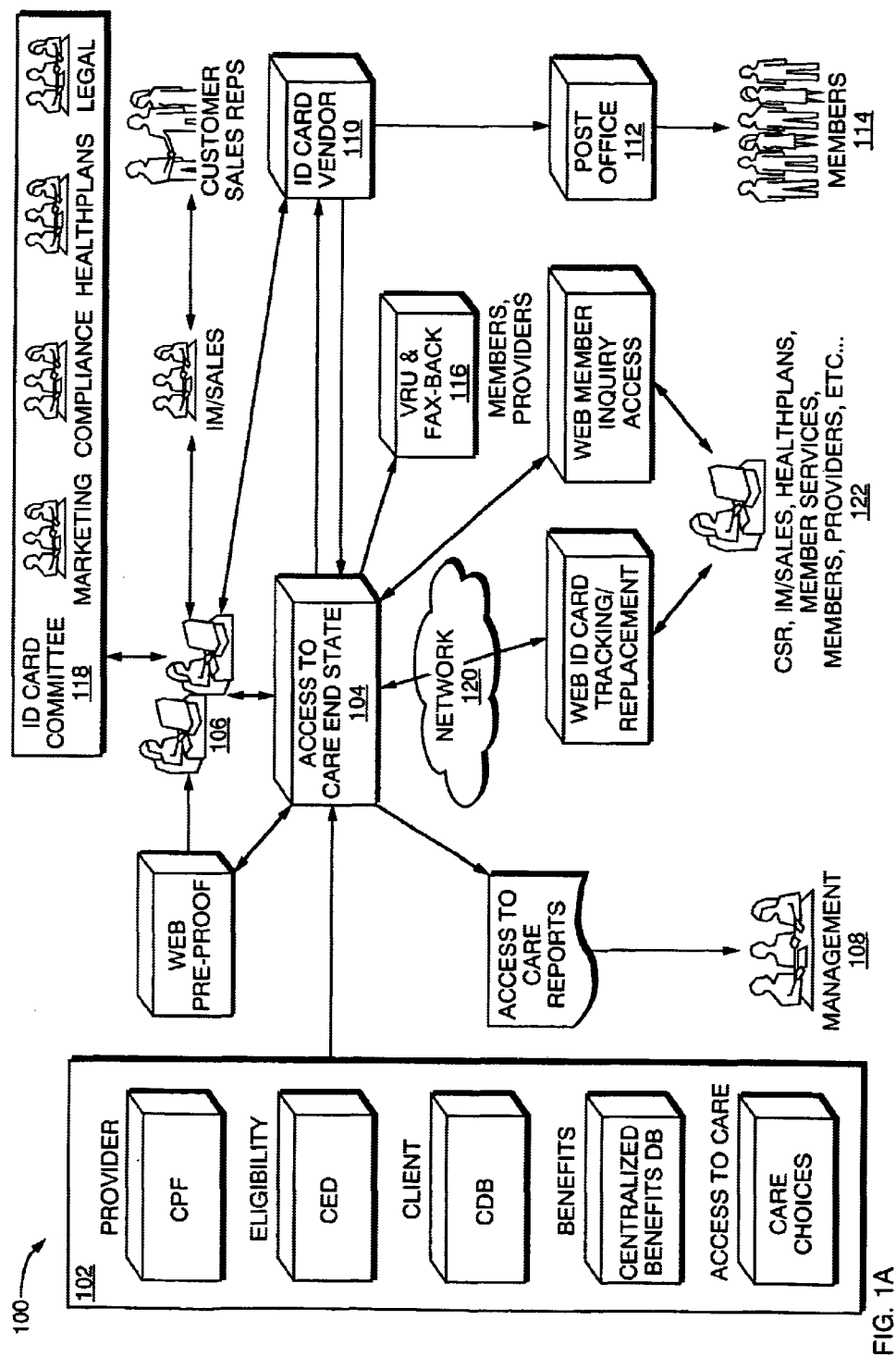
FIG. 1A illustrates a preferred embodiment of a system for carrying out the methods of the present invention.

FIG. 1A illustrates a preferred embodiment of a system 100 for implementing a process for generating an identification card documentation data file in accordance with a preferred embodiment of the present invention. Identification card documentation refers either to information on the identification cards themselves or information on collateral associated with the identification cards. While some of the details provided in describing system 100 are specific to health care benefits, including dental benefits, system 100 may be used to generate an identification card associated with any type of insurance program within the scope of the present invention. System 100 includes one or more databases 102, which may store provider information, eligibility information, client information (i.e., the organization contracting with the provider for benefits or coverage), benefits information, business rules and other application specific data. System 100 also includes access to care tool 104, which is used by the system operators 106 to, among other things, input and edit information stored in database(s) 102, generate an identification card documentation data file, generate a print file used for printing physical identification cards, and control access to information contained in the identification card documentation data file. In particular, in the preferred embodiment, access to care tool 104 accesses, in the preferred embodiment, eligibility information, provider information, benefits information, client information, contracting organization information and business rules in database(s) 102 to obtain the information necessary for generating an identification card documentation data file representative of one or more identification cards.

Eligibility information may include, for example, members' names, addresses, associated primary care physicians (if applicable), employers, status, networks and whether the member is part of a preferred provider organization (PPO) or health maintenance organization (HMO), as illustrated in FIG. 2A. Provider information may include information about providers such as their name, contact information, network information and other information, as illustrated in FIG. 2B. Benefits information may include detailed benefits information for each contracting organization, such as the type and amount of any co-payment required and other information related to mental health/substance abuse benefits coverage, as illustrated in FIG. 2C.

Client information may include information about and specific to the client, including the structure of the contracting organization. For example, a client may have different coverage or benefits for its hourly employees than for its salaried employees. Another example includes the different data items required for an HMO (such as the primary care physicians networks) in contrast to a PPO (such as the areas of service and in-network doctors). FIG. 2D illustrates an example of some items of client information.

Database(s) 102 may also store information regarding the contracting organization such as any text, graphics or logos specific to the contracting organization that may be placed on the identification card.

The business rules maintained in database(s) 102 may relate to, for example, compliance with state legislation or rules of the provider and/or contracting organizations. Examples of business rules are shown with reference to FIGS. 3A and 3B. FIG. 3A illustrates an exemplary list of rules, set by the provider, that must be met before a card is produced. FIG. 3B illustrates examples of rules for complying with state legislation. Table 304 indicates that, in Georgia, if the member does not have a mental health/substance abuse benefit, that information must be stated on the card. Table 306 indicates that, in Virginia, a form number must be added to the left bottom of the standard card template. Table 308 indicates that a custom template must be used to create cards in Minnesota to comply with rules of that state. Thus, if a card is being created for a member in Georgia, the rule in Table 304 may be implemented, among others. For a member in Virginia, the rule in Table 306 may be implemented, among others. For a member in Minnesota, the rule in Table 308 may be implemented, among others.

FIGS. 1B through 1E illustrate a preferred embodiment of a data model that may be used to organize the data stored in database(s) 102. For example, rule type table 160 may include, for example, the type of rule, a description of the rule, the category for the rule, the last time the rule was edited and by who, and an indication of an error generated as the result of application of a specific rule. Information on business rules may be maintained in business rules table 161. The information in business rules table 161 may include, for example, the rule type, effective date and cancellation date, the rule value and type (i.e. the number of days), and the last time the rule was edited and by who. Information on state rules may be maintained in state rules table 162. This table similarly may include, for example, information such as the rule type, product classification, state code, ASO funding, rule effective date and cancellation date, rule value, and the last time the rule was edited and by who.

Other information stored in database(s) 102 and used for the generation of identification cards will be known to those skilled in the art and is within the scope of this invention.

In a preferred embodiment of the invention, a steering committee 118 makes decisions about the identification cards, which are ultimately implemented as business rules. These decisions may relate to marketing, compliance, legal or health plan concerns. For example, the marketing department may provide input for business rules relating to the physical characteristics of the identification card, placement of items of information on the identification card (to the extent not otherwise dictated) and any trademarks and/or logos used on the card. Compliance and legal may provide input as to business rules relating to state legislative requirements and whether to issue cards for different types of products. Representatives from a particular health plan may provide input regarding business rules relating to for example, provider details or network branding. These decisions are provided to system operators 106, inputted as business rules, and stored in the appropriate location(s) of database(s) 102.

Figure 1F:
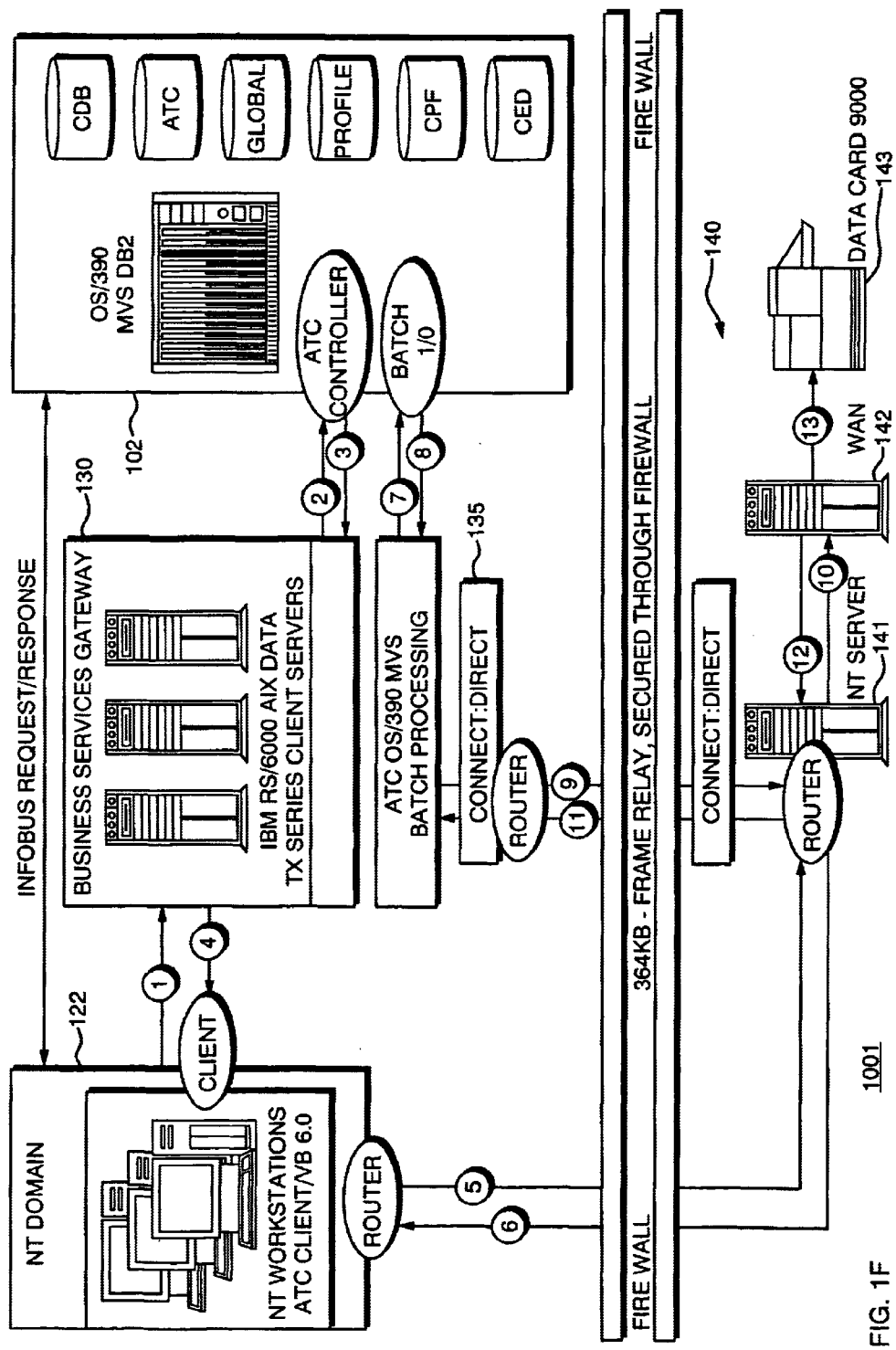
FIG. 1F illustrates a preferred embodiment of a system, providing examples of the hardware used, for carrying out the methods of the present invention.

FIG. 1F illustrates a preferred embodiment of a system 1001 that includes certain exemplary hardware components used for carrying out the methods of the present invention. A request initiated at client machine 122 to access database (s) 102 is routed through business services gateway 130. Information retrieved from database(s) 102 is sent back to client machine 122 through business services gateway 130. Information residing on identification card vendor network 140 can also be accessed by client machine 122. For example, post-proof image files and other data maintained on server 141 can be viewed on client machine 122.

In order to initiate the printing of a batch of identification cards, access to care batch processing tool 135 can be used to retrieve data from database(s) 102. Upon return of the data, the data is sent to identification card vendor network 140. At identification card vendor network 140, the data is converted to ASCII, processed and stored in a database on server 142. A file is returned to access to care batch processing tool 135. The identification cards may then be printed by printer 143.

With reference to FIG. 1A, upon an organization contracting with the provider to provide health care benefits coverage to the organization's employees, system operators 106 input information relating to the contracting organization (including client information and business rules that are particular to the contacting organization) and member information (such as eligibility information and provider information), using access to care tool 104 and stores such information in database(s) 102. While entering the member information, system operators 106 may, in some embodiments, also set a trigger in a record associated with a particular member. At a subsequent predetermined time, access to care tool 104 identifies all records with the trigger and generates an identification card documentation data file that includes the data necessary for the creation of a physical identification card for each member. The identification cards may be viewed electronically by system operators 106 prior to the physical cards being generated, which allows the system operators to ensure that items of information are positioned properly on the identification card.

In a preferred embodiment of the invention, after a relationship is established between the contracting organization and the provider, a member may request a new or replacement identification card. Upon providing identifying information, a request for a new card may be made using access to care tool 104 and a trigger set to create a new card for the member. As part of a nightly batch or extraction process, access to care tool 104 obtains the information from database(s) 102 for all records associated a trigger, including the record for the member requesting a new card, and generates the appropriate identification card documentation data file.

Once the identification card documentation data file is complete, a print file may be created (including data in the identification card documentation data file) and transmitted to a vendor 110 for printing. Upon printing each identification card (either by batch or individual cards), vendor 110 may send the cards to post office 112 for mailing to members 114. A data feed may also be sent from the vendor to the provider providing information such as when and how many cards were issued and sent.

In some instances, errors occur during the generation of the identification card documentation data file. For example, a member enrolled in an HMO may have selected a primary care physician who is no longer in the network. In this case, a report may be generated by access to care tool 104, indicating the errors that occurred and prevented generation of an identification card. Such reports may be stored for later viewing, inquiry and reporting by, for example, management personnel 108.

In a preferred embodiment, the inventive system is accessible via a computer network as shown in FIG. 1A. This enables inquiries to be made of access to care tool 104 over the network via a client machine (e.g., a personal computer) 122 by, for example, contracting organizations, health care providers, or members of the sales and marketing staff of the provider. For example, one of these entities may seek to access information in the identification card documentation data file, view an identification card, request replacement of an identification card, or track the status of a replacement card previously requested. This alternate electronic access mechanism reduces dependency on the physical identification card.

Information contained in the identification card data file may be accessed by individuals (such as health care providers or members) via other electronic means, such as a voice response unit 116. For example, a member may have misplaced his card and want to know the amount of his co-payment for doctor's office visits. This member may access the identification card documentation data file by voice response unit 116, identify himself and request information regarding his co-payment. Access to care tool 104 may obtain a fax number at which the member may receive faxes and fax the co-payment information to the member.

Figure 4A:
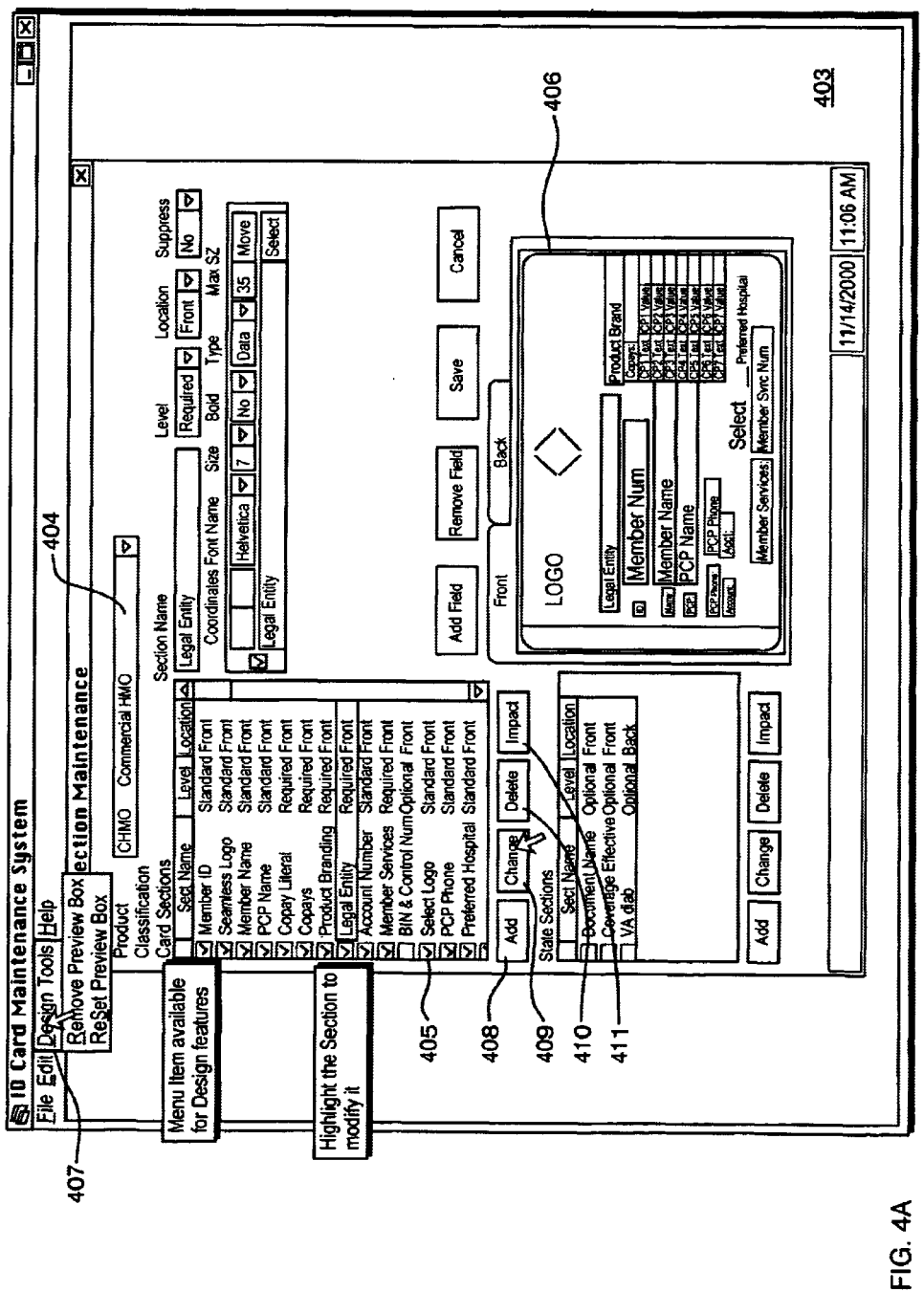
Figure 4B:
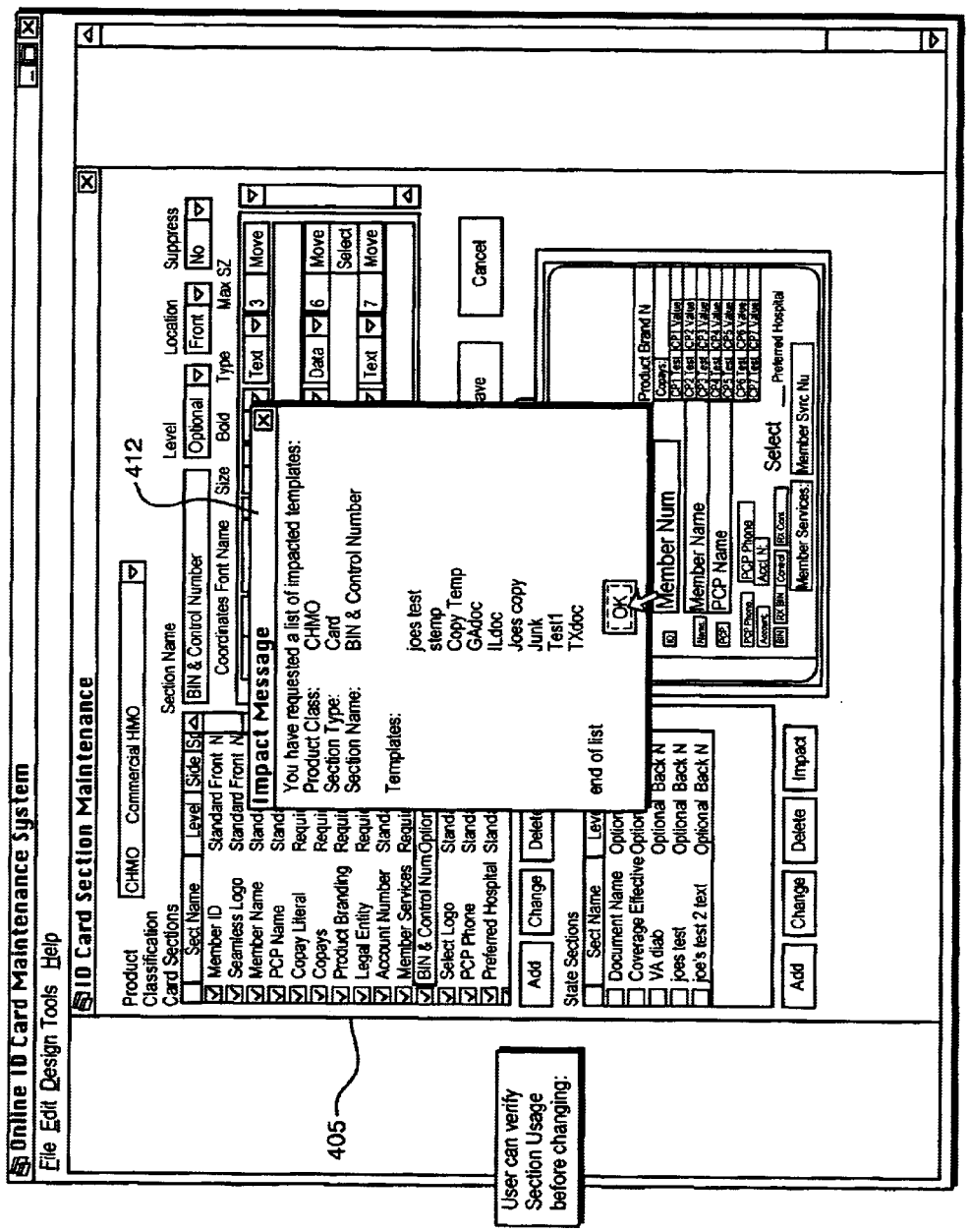
Figure 4C:
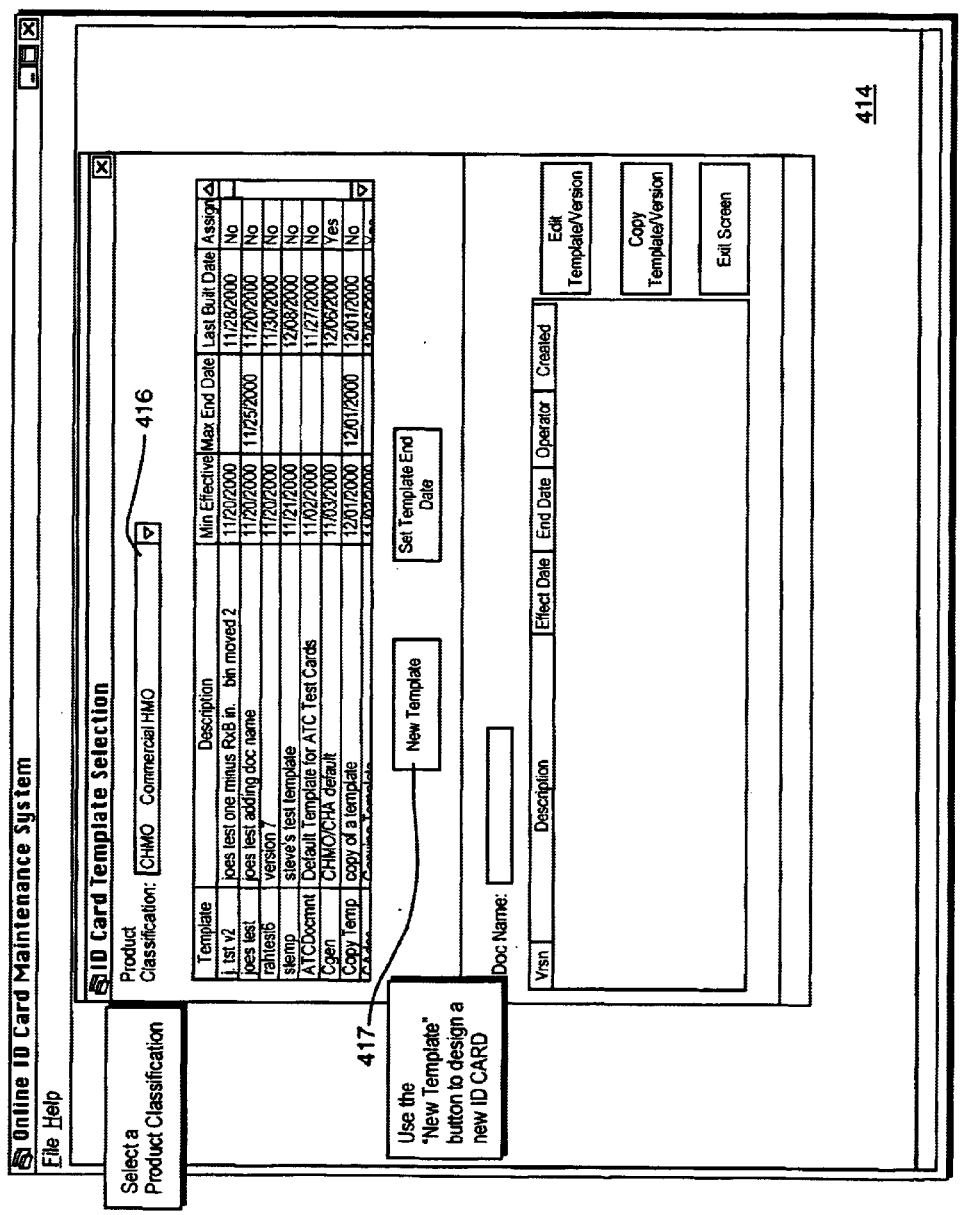
Figure 4D:
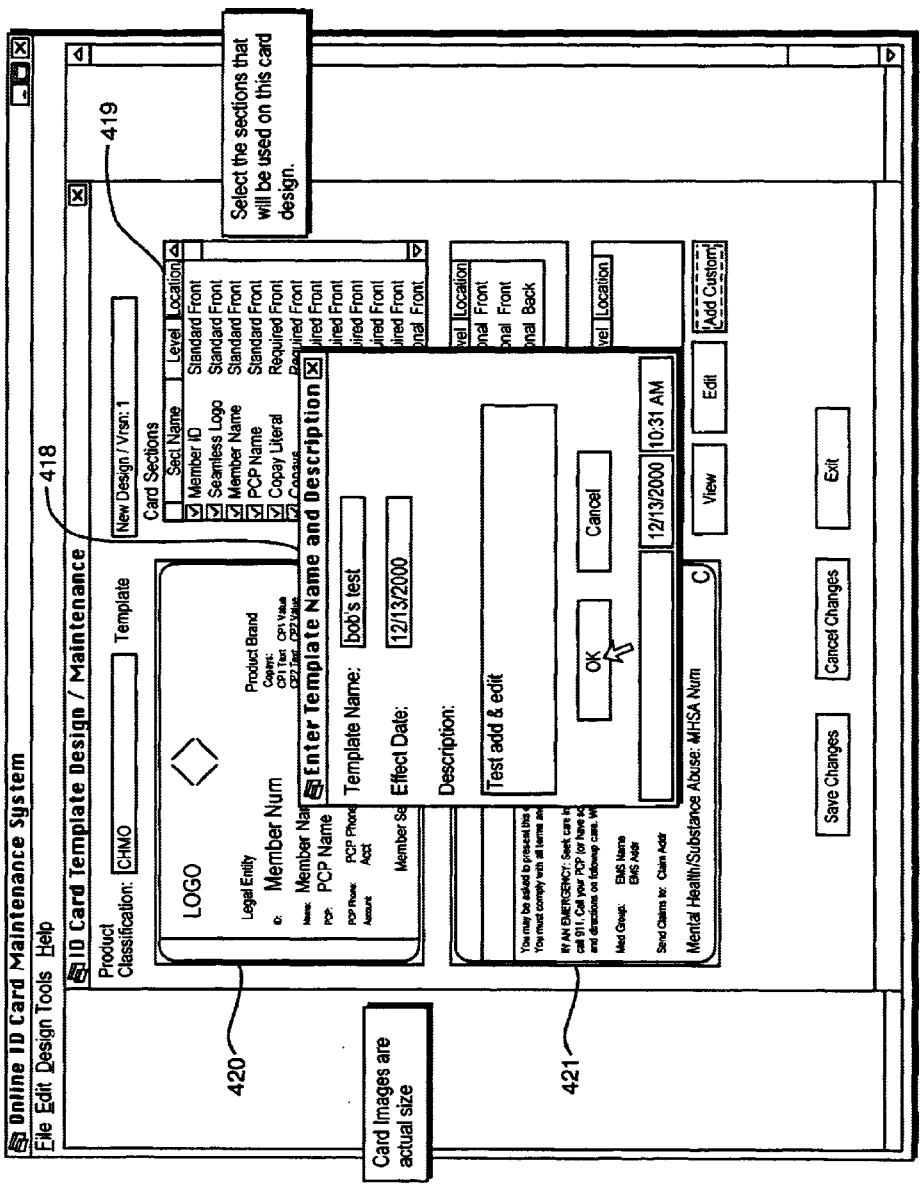
Figure 4E:
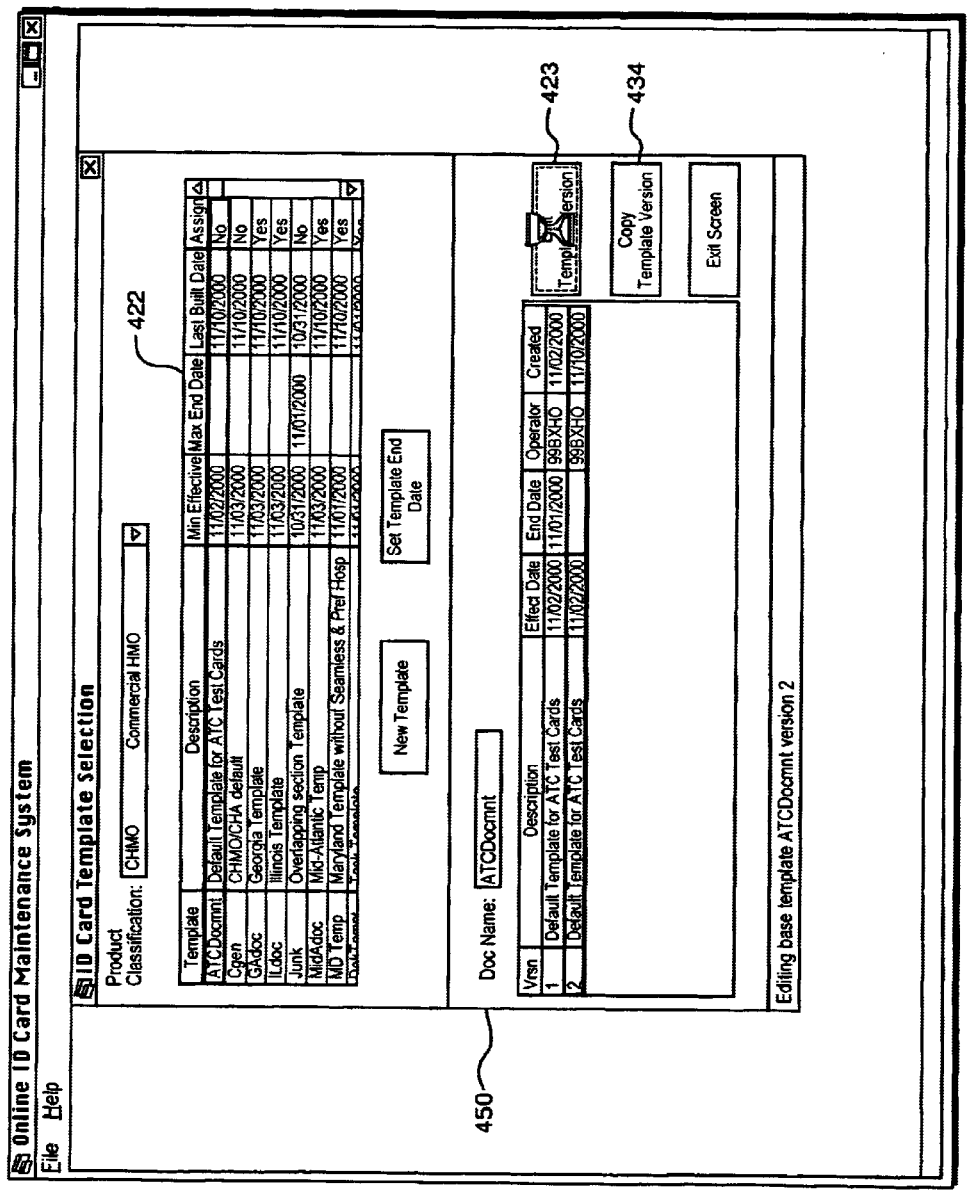
Figure 4F:
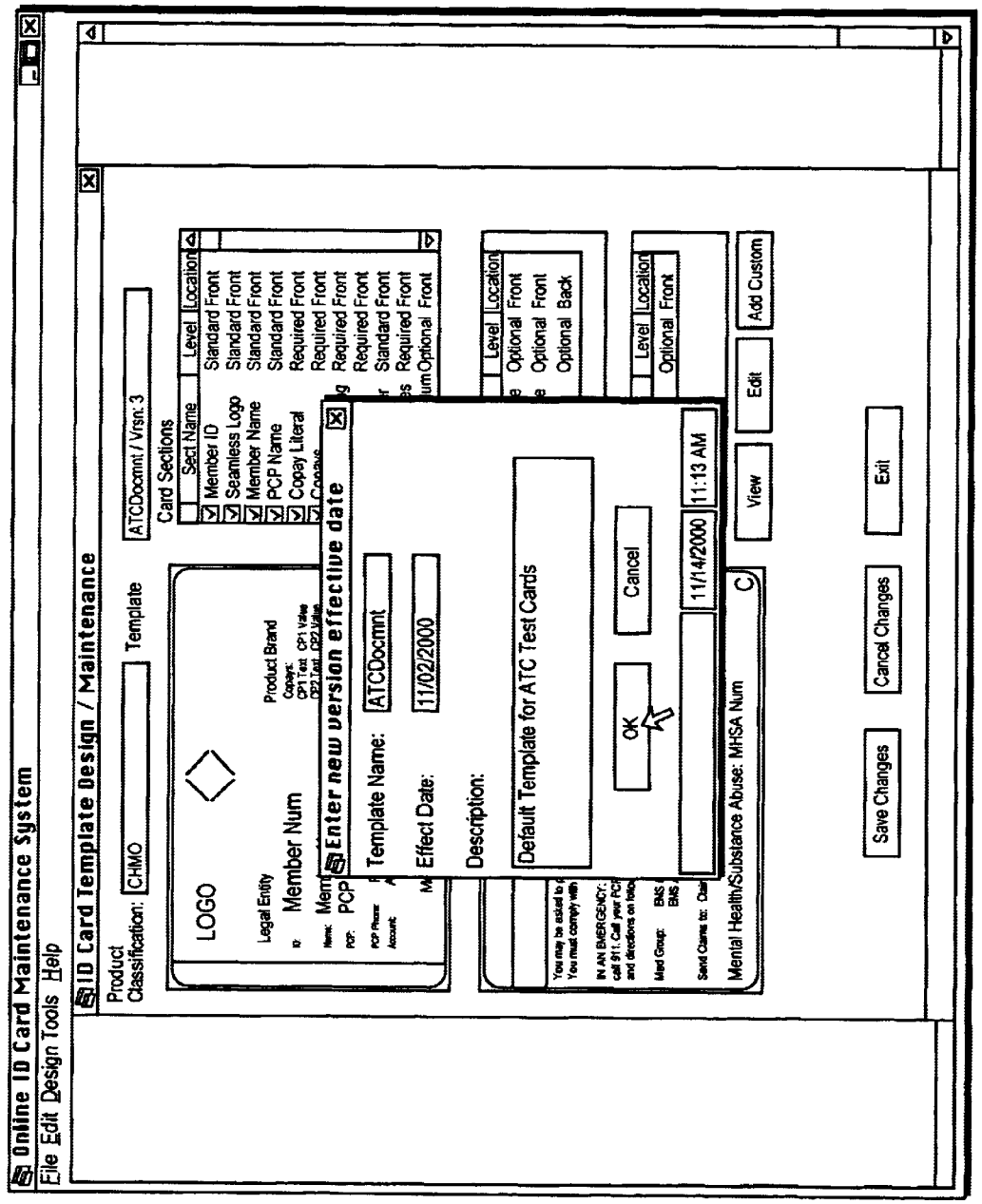
Figure 4G:
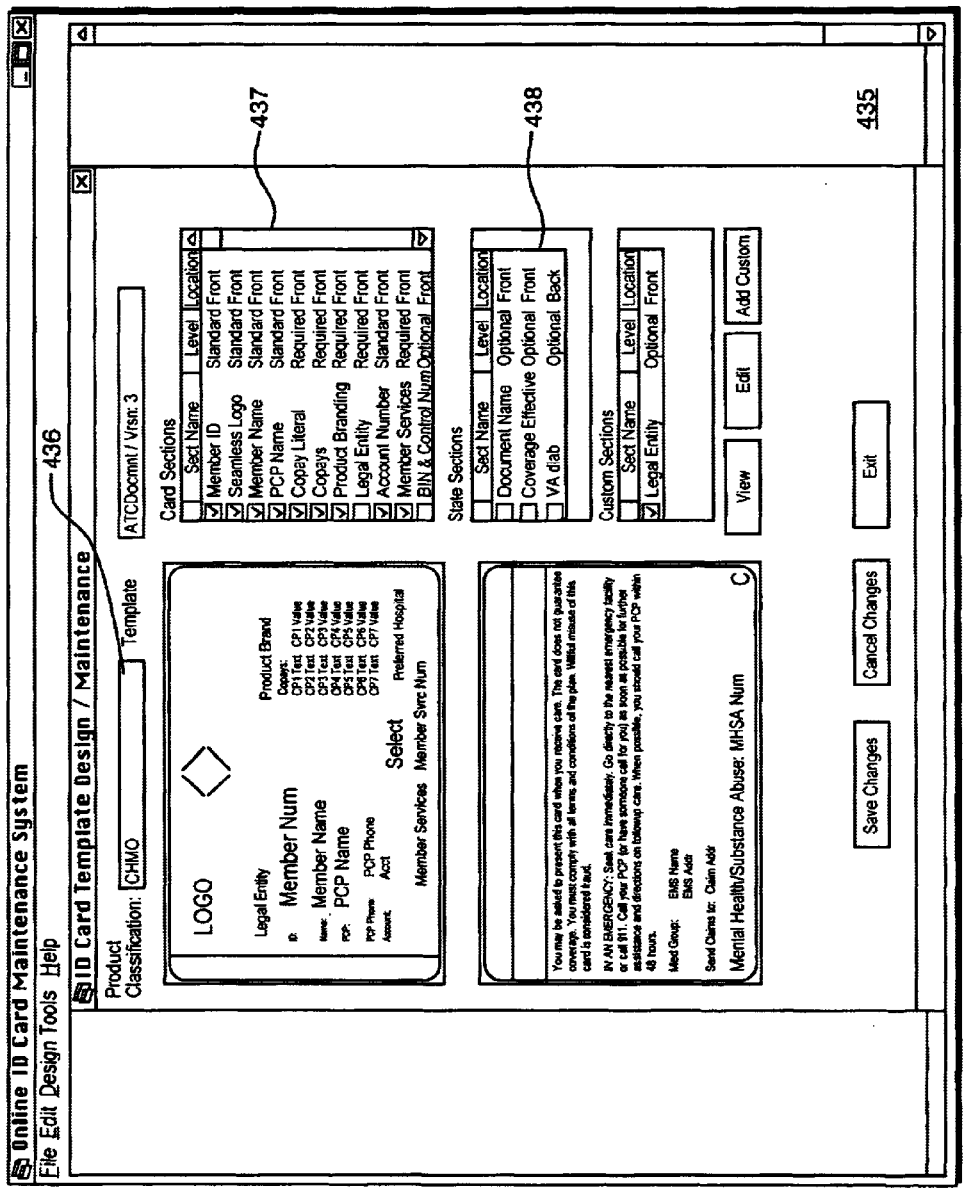

In a preferred embodiment of the invention, the physical identification card includes a magnetic strip (as shown in FIG. 4G). The magnetic strip may include information that is printed on the card or, in the preferred embodiment, may allow for verification of information not printed on the card. For example, the health care provider may swipe the identification card in an electronic card reader, thereby transmitting information (such as member identification information) to the health care benefits provider. The health care benefits provider may then return data to the health care provider indicating, for example, whether the member is presently covered by the health care benefits plan.

FIGS. 4A through 4J illustrate an example of a preferred embodiment of a user interface for implementing the administrative aspects of access to care tool 104. A user may navigate to screen 403 shown in FIG. 4A which allows a user to create or adjust the card sections (regular card sections and state specific sections) to be used in the creation of card templates. Each section includes one or more field segments. Each section's field segments are used, for example, to control placement of data (vertically and horizontally), font sizes and characteristics, data type (text, data, image), and source of the data field (e.g. database column name, image file name or actual field text). The combination of sections and the field segments that comprise those sections will determine what the card design will look like.

Thus, product classification 404 allows the user to select the type of health benefit plan (in this example, a commercial HMO). Upon selecting, in this example, a commercial HMO, card section area 405 presents a list of sections on the identification card that the user may select (by clicking on the box next to the section name) for editing or creating, as shown in FIG. 4A. The sections selected for the identification card in card section area 405 are then displayed in preview box 406. Design tools 407 may be used to remove or reset preview box 406. In order to add, modify or delete a particular section of card section area 405, the user highlights the section in card section area 405; selects add button 408, change button 409 or delete button 410; and then makes any changes or additions in preview box 406. The user may verify the usage of a particular section in card section area 405 by clicking on impact button 411. Impact message 412, shown in FIG. 4B, describes the product class, section type, section name and the types of templates impacted by the section selected.

A user navigating to screen 414 shown in FIG. 4C may create a new template. The user must again select a product classification (in this case, a commercial HMO) in product classification 416. The user then indicates, by clicking new template button 417, that the user wishes to build a new template. As shown in FIG. 4D, template name and description box 418 allows the user to enter the name of the new template, indicate an effective date and provide a description. In card section area 419, the user may select the sections that will be used on the template being created. The card front 420 and card back 421 shown on the user interface are the actual size of the physical identification card.

Referring to FIG. 4E, the user may also select a particular template it wants to edit or of which it wants to create a new version by selecting the template in template box 422. The different versions of the template selected will be presented in version box 450. Use of effective and end dates controls the maintenance of multiple versions. A particular version may be edited by clicking on edit/version button 423. The new version effective dates may be inputted as shown in FIG. 4F. The user may also create a new version based on the sections used on the selected template as a model by selecting the copy template/version button 434 of FIG. 4E.

Screen 435 of FIG. 4G illustrates the manner in which the user may create a new card template or maintain/edit an existing template. The product classification 436 selected controls the card sections 437 listed. The state sections 438 are also listed upon selection of the product classification, but are not controlled by it. The user can then select the section fields from card sections 437 and state sections 438 that it wants listed on the identification card. Certain sections may be required. As selections are made by the user, they are displayed on screen 435. The templates created and modified are stored in database(s) 102.

Figure 4H:
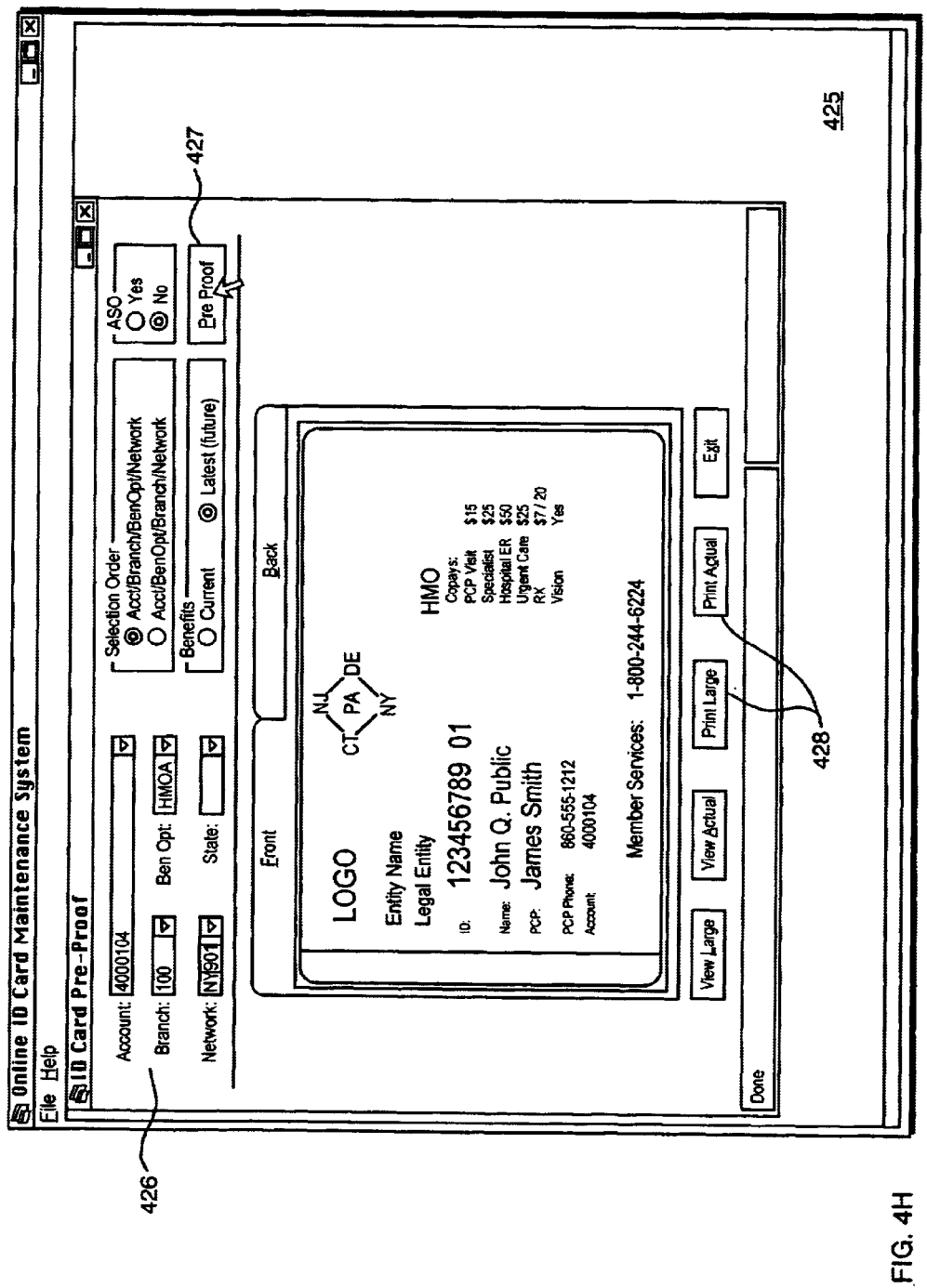
Figure 41:
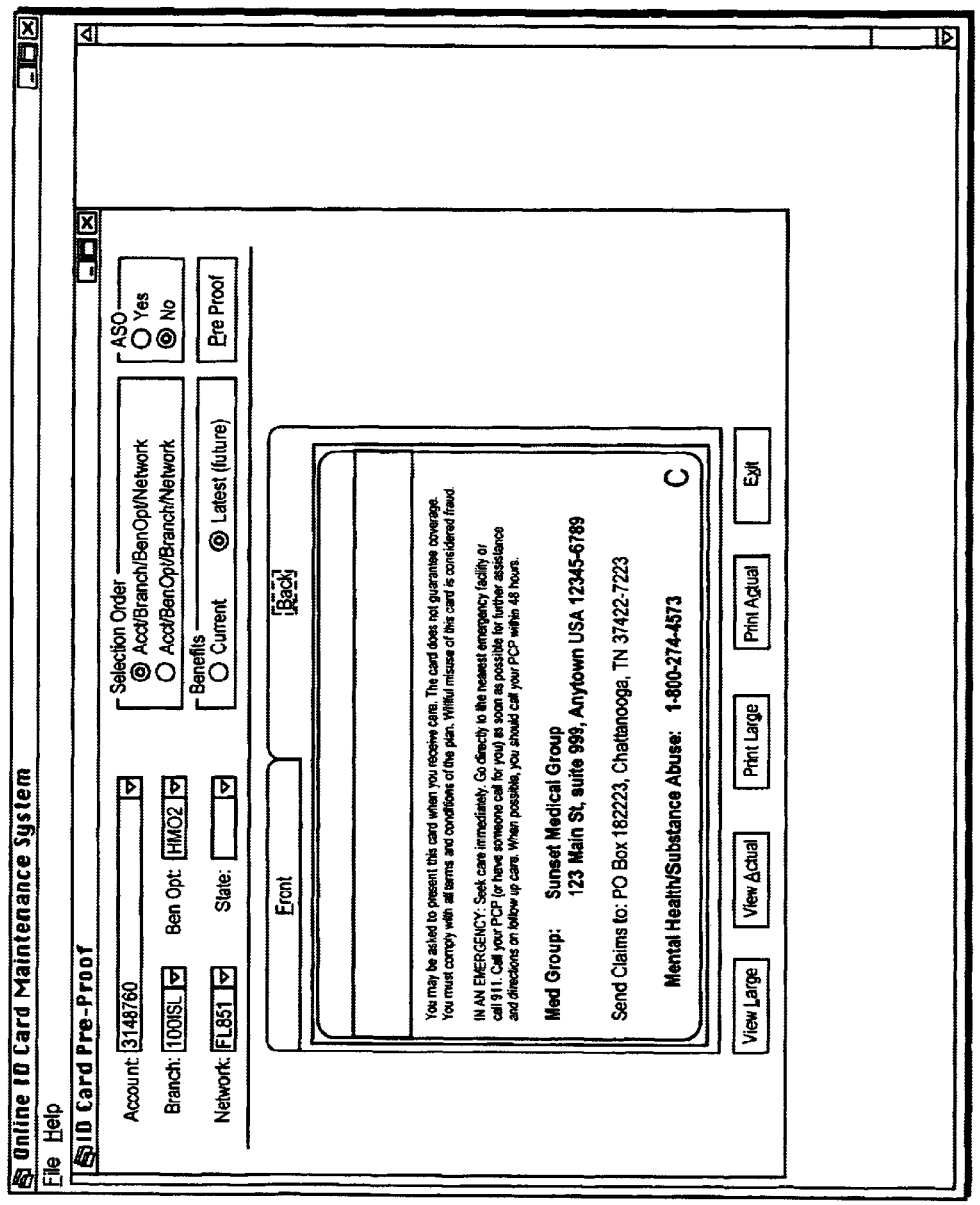

A user may employ screen 425 shown in FIG. 4H to pre-proof the identification card. The user may input information in identification area 426 (such as account and branch number, benefits option, network for the account selected as well as the state), and click on pre-proof button 427 to preview both the front of the identification card and back of the identification card (an example of which is shown in FIG. 4I) corresponding to the identification information entered. The identification card image is viewed as it would be generated by the printing process for a given account structure. The benefit data displayed is determined based on the account structure entered. The network selected will be used to determine the HMO code, which will be used to derive the legal entry that is displayed on the card image. Dummy information may be used for member data and PCP information display during the pre-proofing stage. A paper print out of the card can be made by clicking on either of print buttons 428. The data used to create the pre-proof image includes client information, template information and rules information obtained from database(s) 102.

Figure 4J:
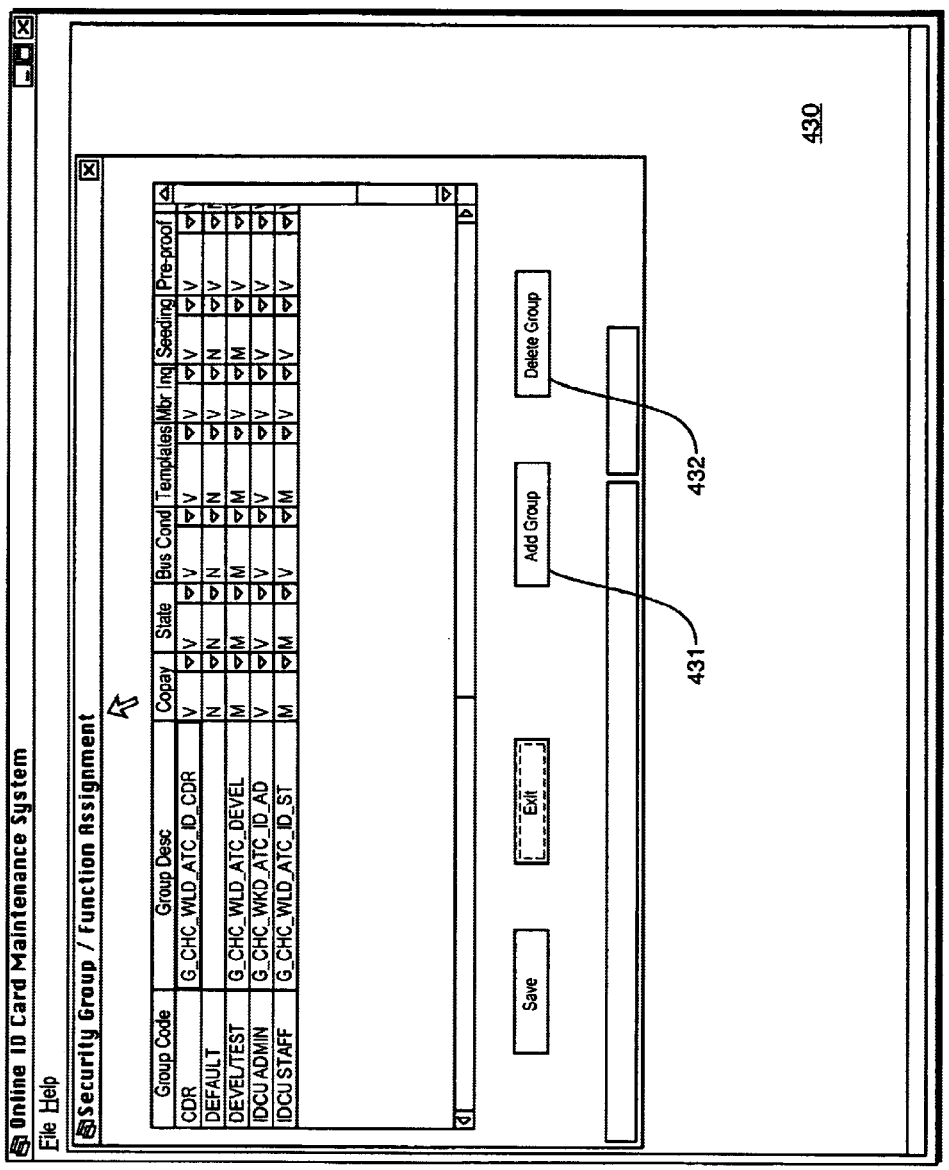

A user may employ screen 430 shown in FIG. 4J to set security access levels for different groups of individuals. For example, as shown in FIG. 4J, the group with the code "CDR" has read-only access (indicated by the "V") to each of the different functions performed by access to care tool 104. The group with the code "IDCU STAFF" has read-only access to certain functions and read/write access to other functionality of access to care tool 104. In some cases, a group may have neither read nor write access to certain functions. Groups may be added or deleted using add group button 431 or delete group button 432. The security information inputted or modified is maintained in a security table of database(s) 102.

Figure 5A:
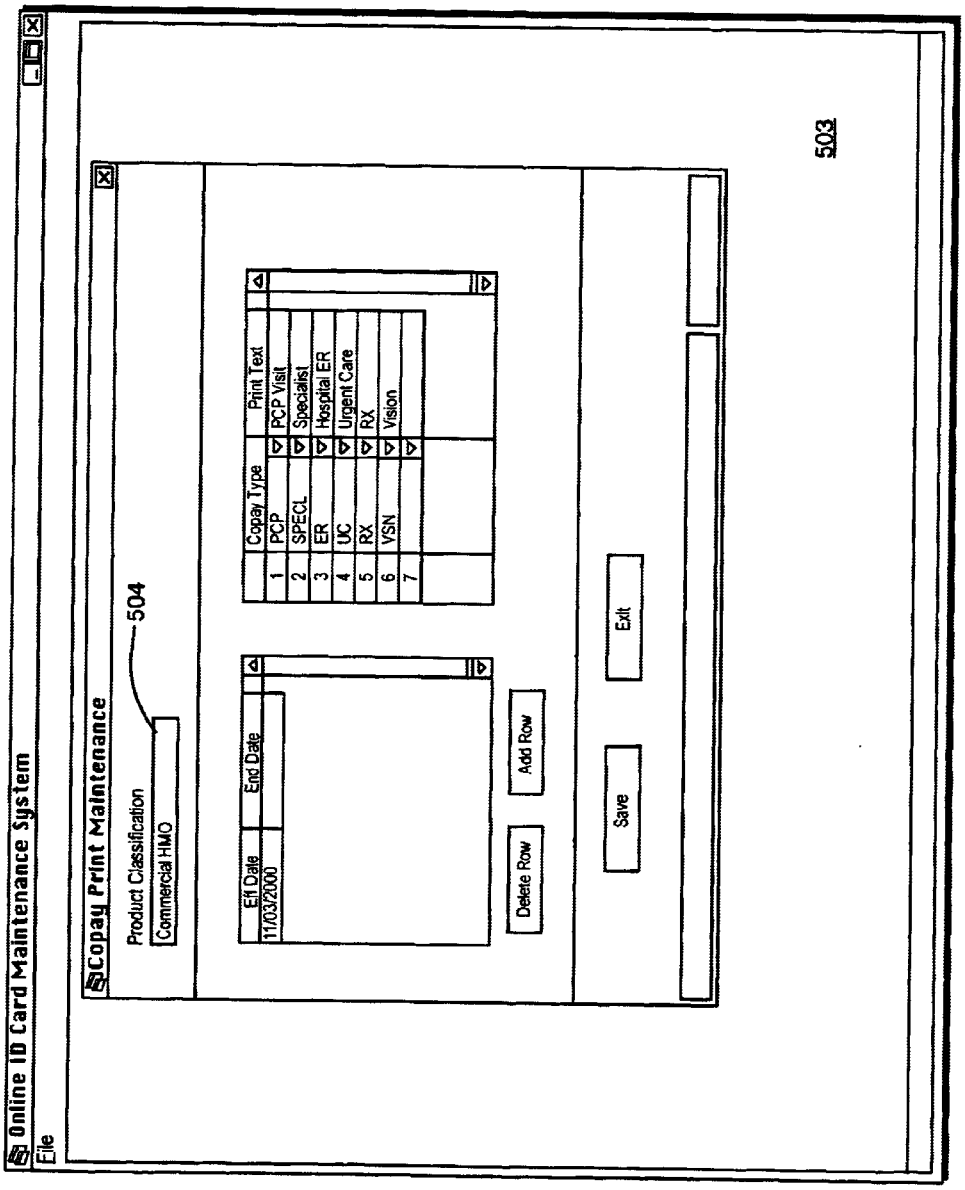
FIGS. 5A–5C illustrate screens of an exemplary user interface used in connection with the present invention.
Figure 5B:
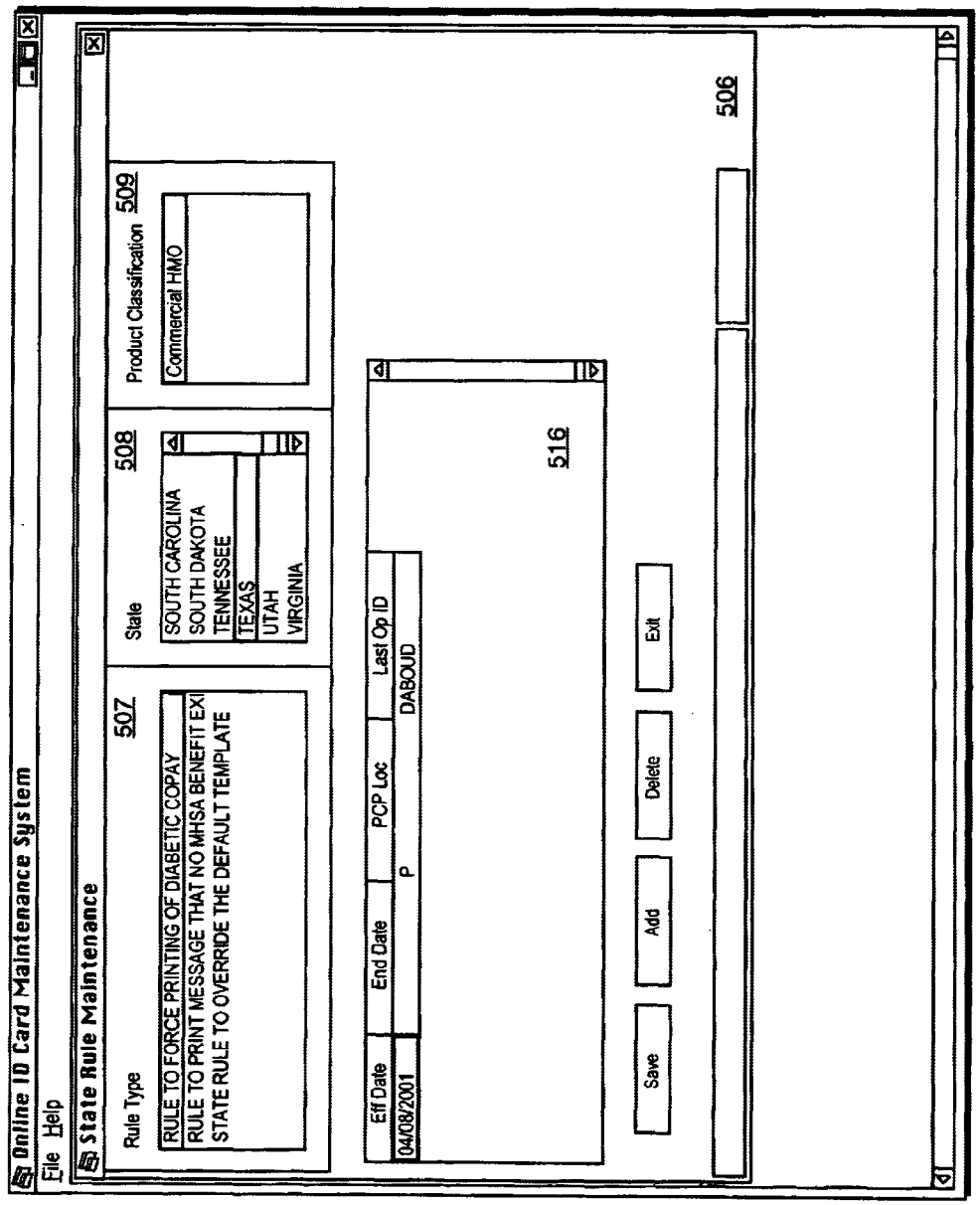
Figure 5C:
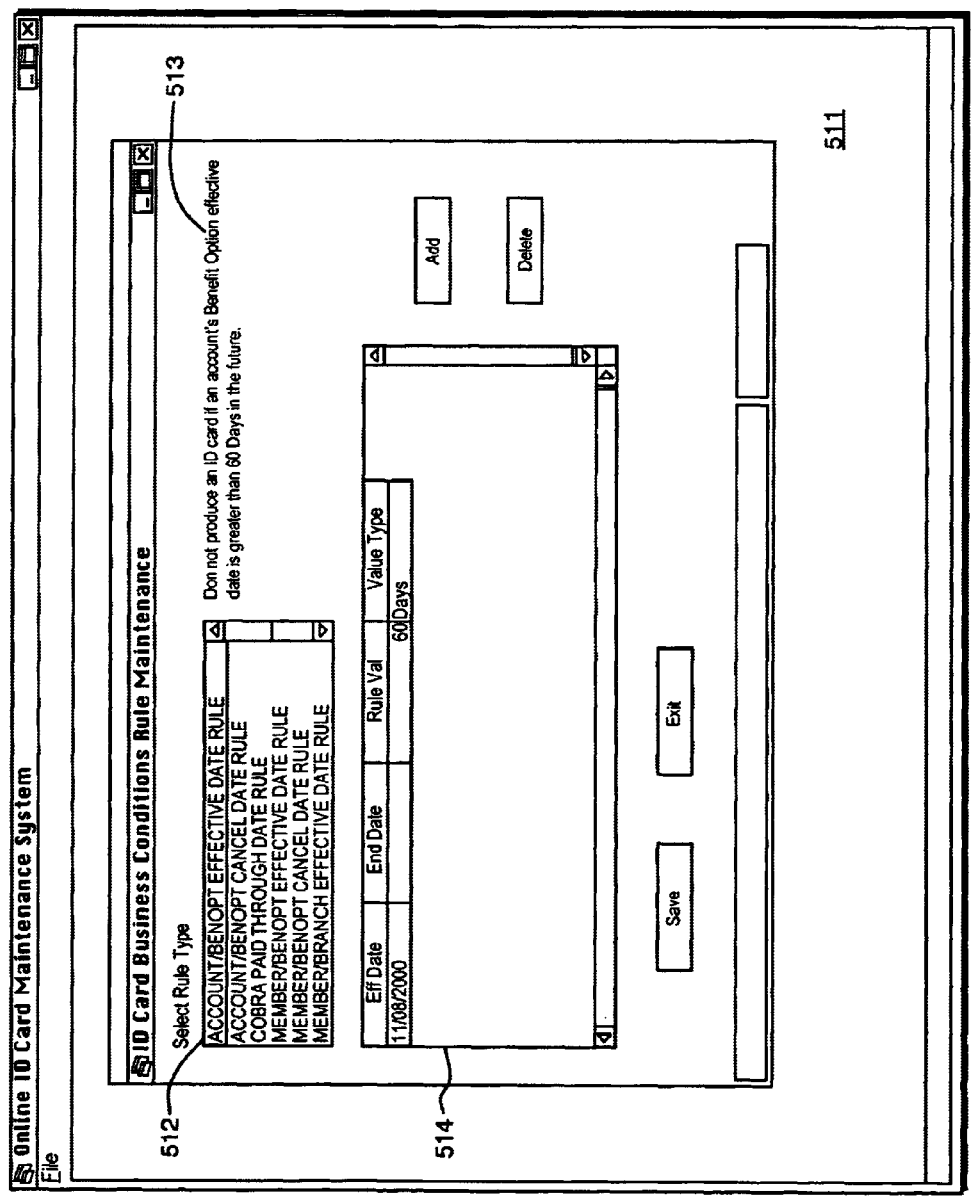

FIGS. 5A through 5C illustrate an example of a preferred embodiment of a user interface for implementing the rules maintenance aspects of access to care tool 104. Using screen 503 of FIG. 5A, for example, a user may identify a product classification 504 (in this case, commercial HMO) and select what co-payment information will be printed on the card for the selected product classification as well as control the printing sequence for different co-pay type codes. Referring now to FIG. 5B, a user may employ screen 506 to activate a preset rule for different combinations of state/product classification. The user selects the rule type 507, for the particular state 508 and product classification 509. In order to activate a rule for a selected state/product classification, the user clicks on the "add" button to confirm addition of a row in rule box 516. The user then inputs the effective date, end date if desired, and selects the location of the primary care physician, in this example. The user may indicate a rule by typing in an end date, delete a row, or modify a row.

Referring now to FIG. 5C, a user may employ screen 511 to edit rule values for existing business condition rules. New business rules must be programmed and stored in databases (s) 102. The user may select the rule type 512 and, in text area 513, the description of the selected rule is provided. The user may change the effective date and value of a particular rule in rule effective date/value area 514. Rows may also be added or deleted using screen 511. The information added, modified or deleted using the rules maintenance function of access to care tool 104 will be reflected in the rules tables of database(s) 102.

Figure 6A:
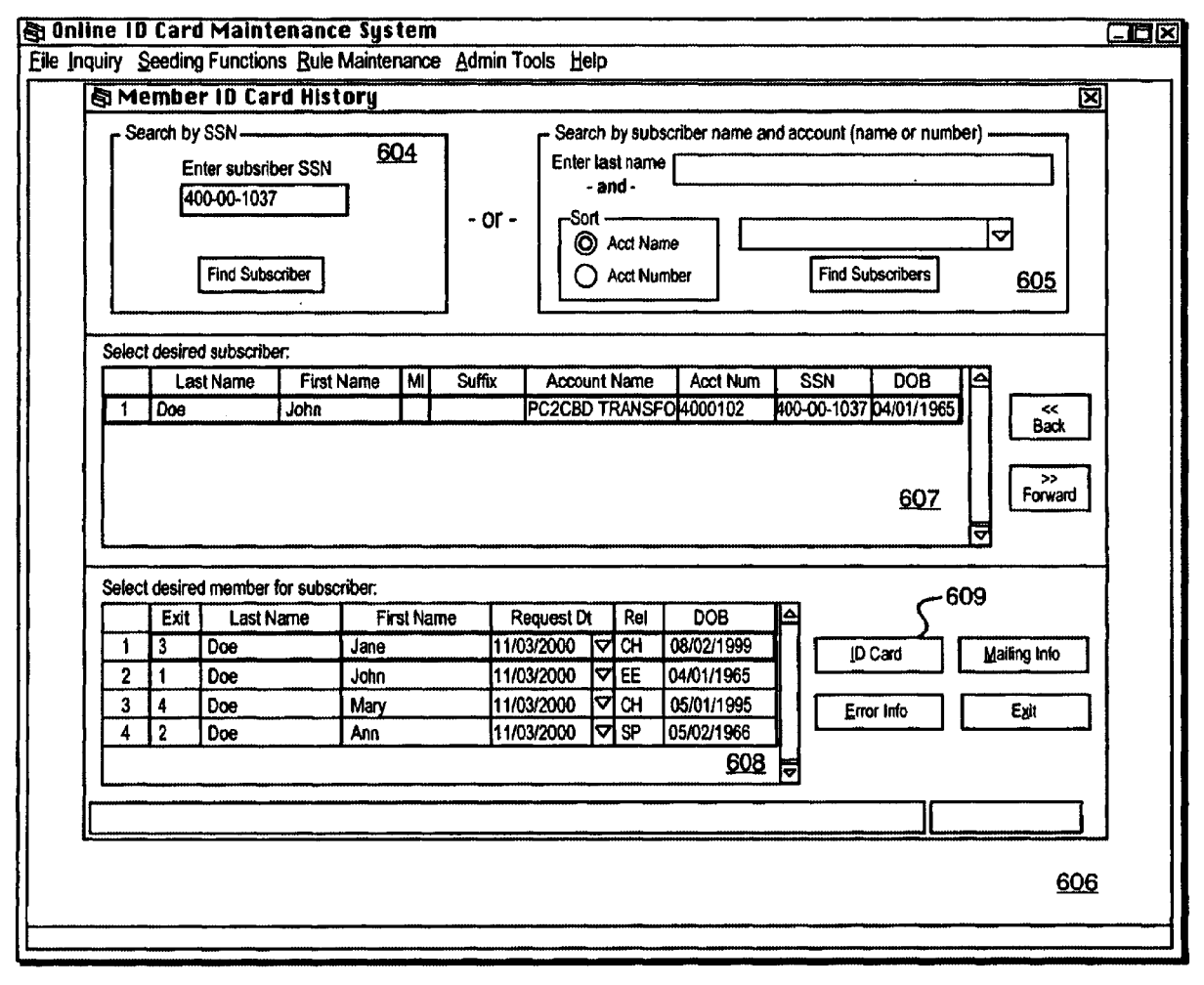
Figure 6B:
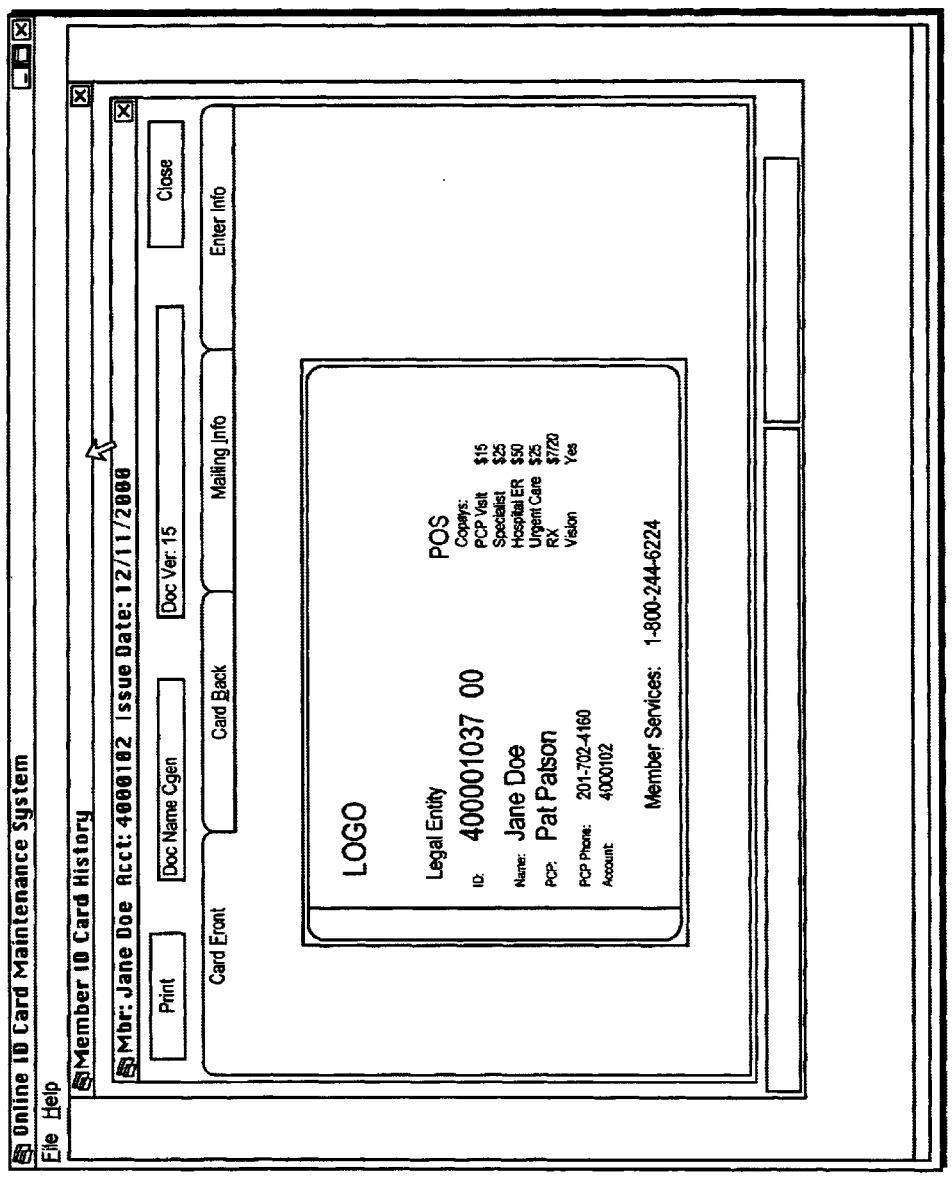
Figure 6C:
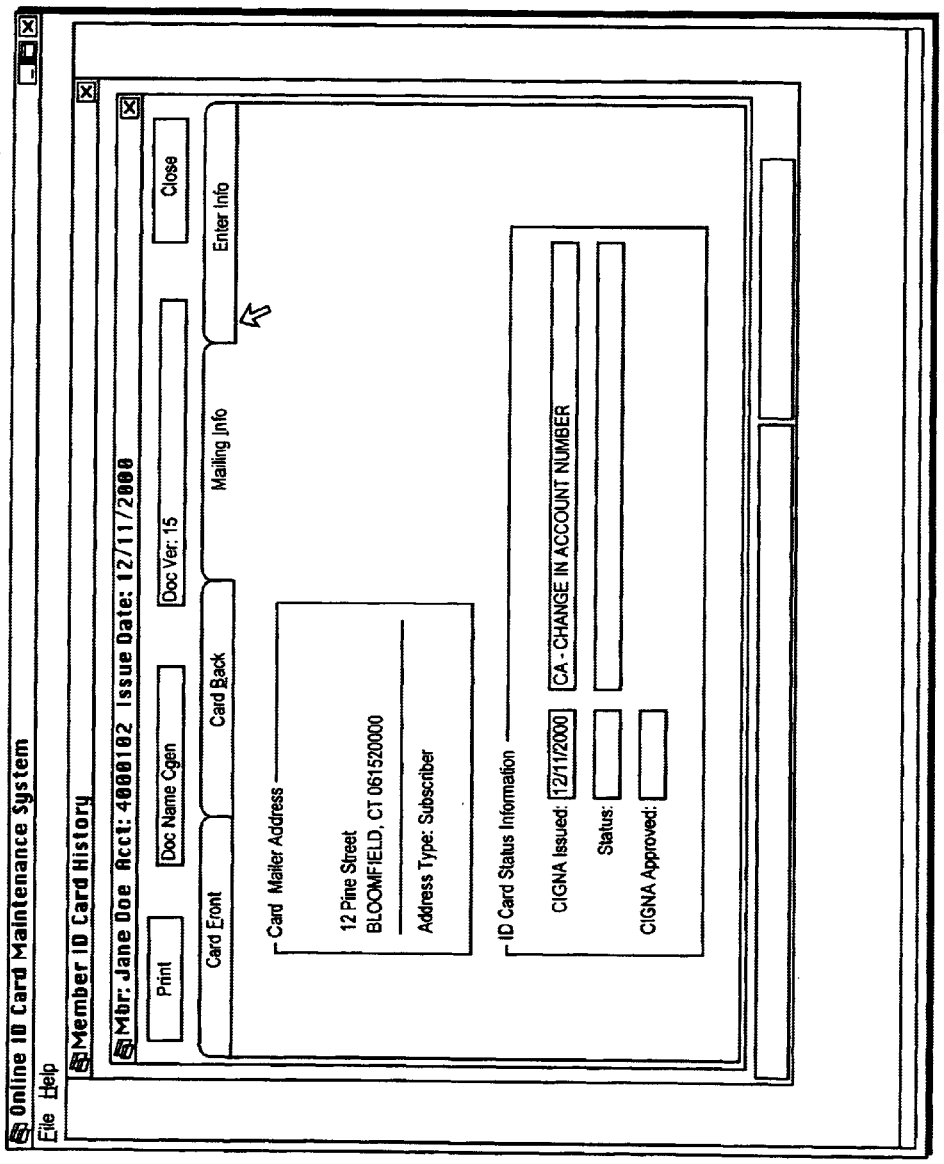
Figure 6D:
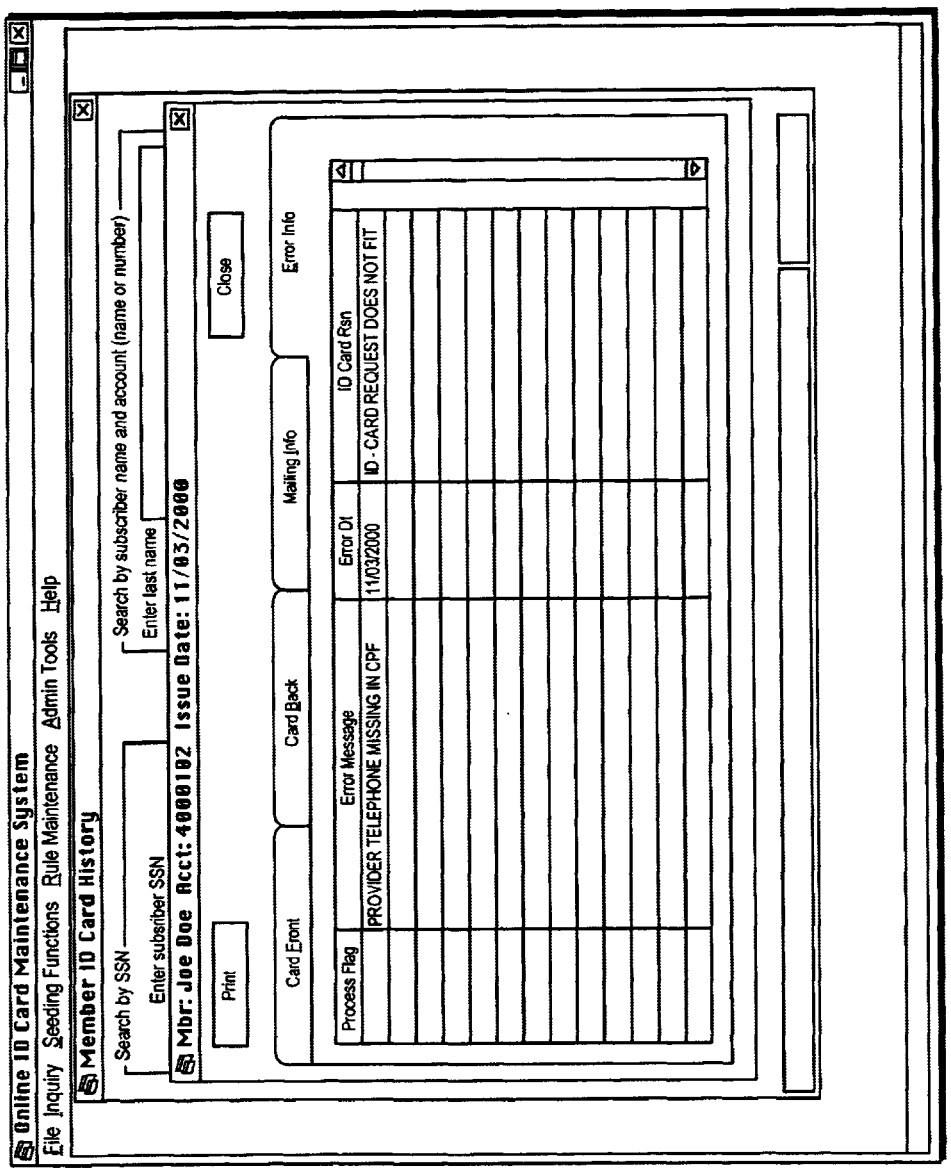

FIGS. 6A through 6D illustrate an example of a preferred embodiment of a user interface for implementing the inquiry functions of access to care tool 104. A user may identify the member of interest to the user by entering the member's social security number or the subscriber name and account number/name. This information may be obtained from the account table of the client portion of database(s) 102. Screen 606, shown in FIG. 6A, is launched, presented to the user and provides information relating to the subscriber at subscriber area 607 and to other members associated with the subscriber at member area 608. The user may select ID card 609 to view the front identification card associated with the particular member chosen at member area 608 (shown in FIG. 6B), the back of the identification card, the mailing information of the particular member chosen (shown in FIG. 6C) and any error information associated with the attempted generation of the card (shown in FIG. 6D). In the preferred embodiment, these screens are view only. As shown in FIG. 6D, the issue date may be included as well as the reason for this issuance of the card (e.g., change in account number, as in this case, or a new subscriber). The status may also be provided (e.g., the card was mailed) and the date of the status. This information may be aggregated to create a report.

Figure 7A:
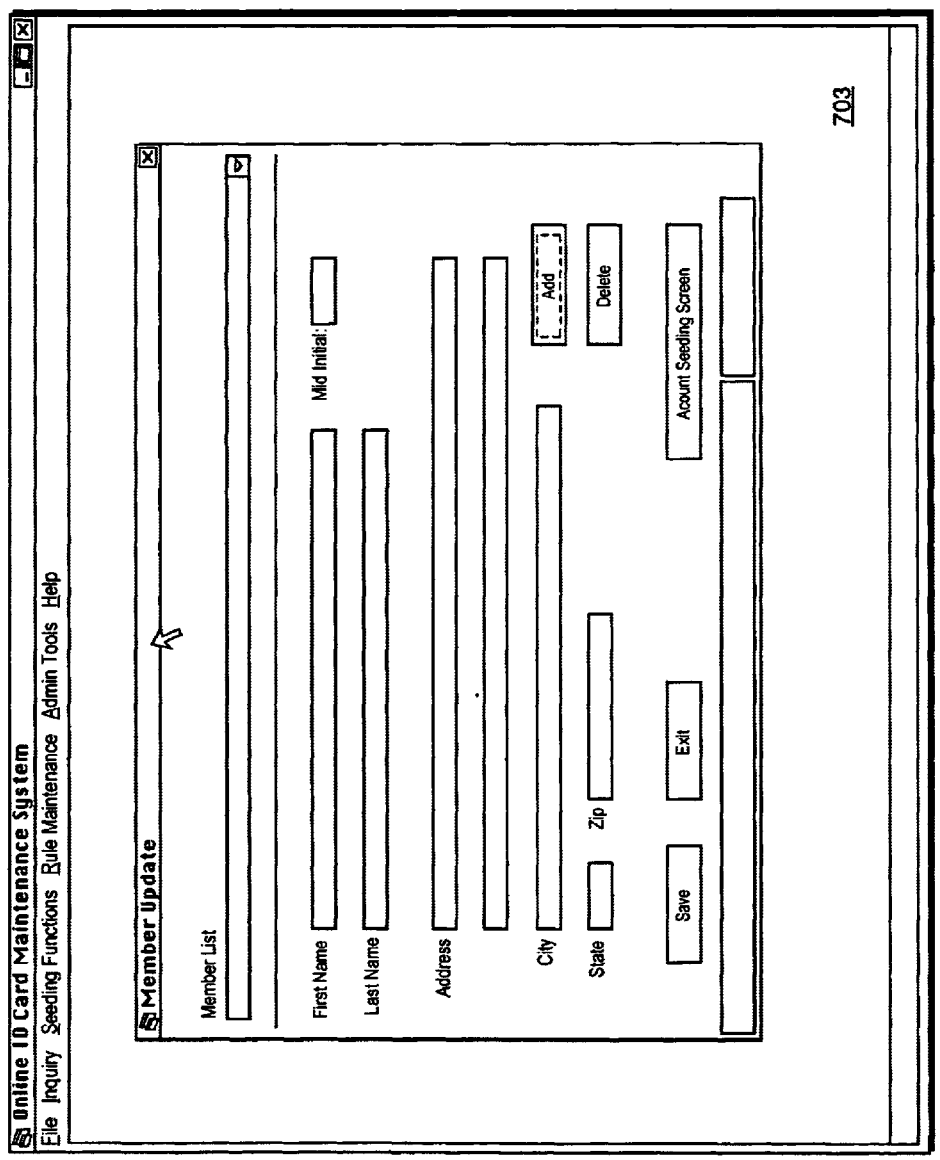
Figure 7B:
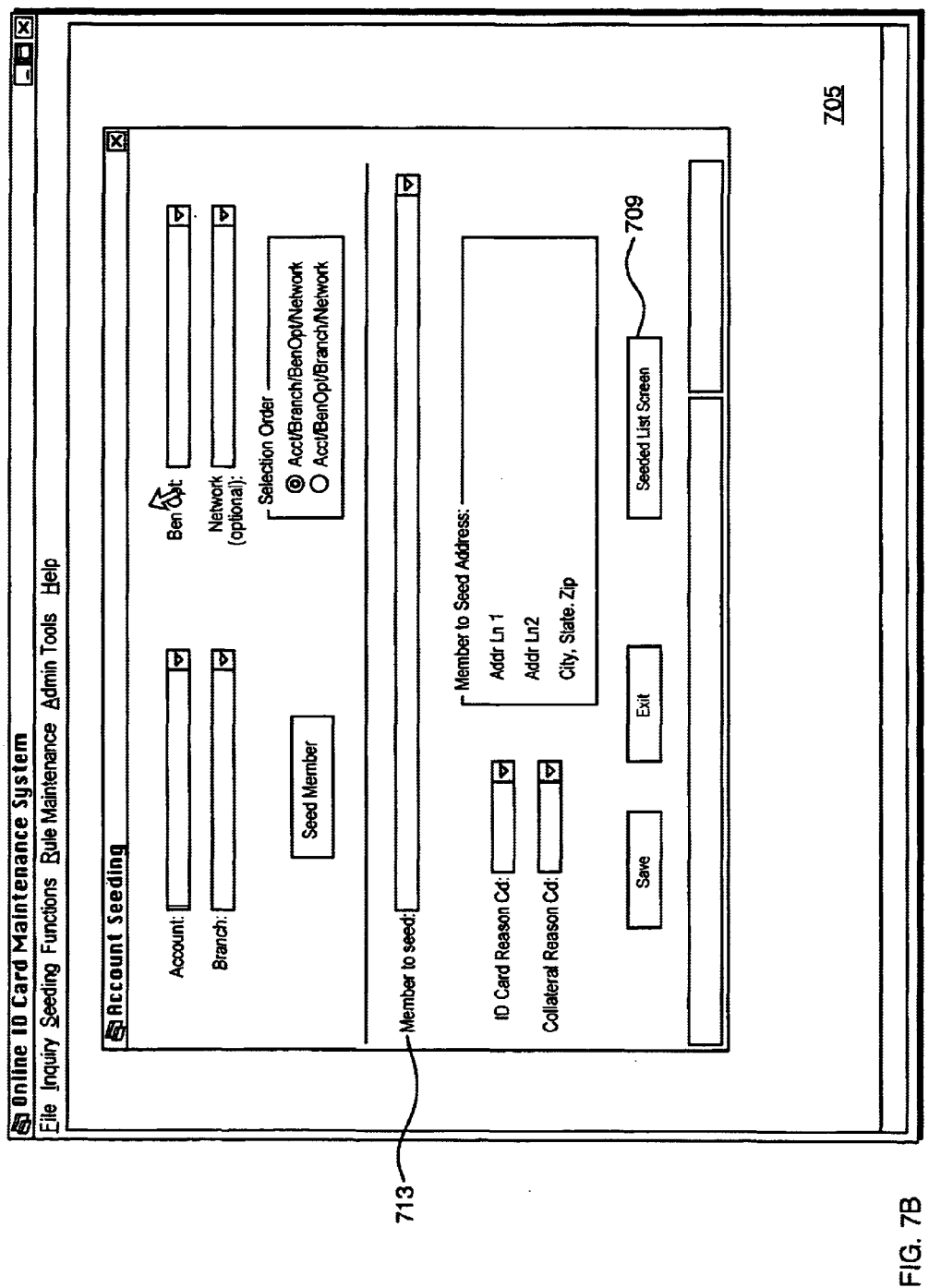

FIGS. 7A through 7C illustrate an example of a preferred embodiment of a user interface for implementing the seeding functions of access to care tool 104. A user may employ screen 703, shown in FIG. 7A, to add or remove members from the candidate list of members who can be seeded. The information inputted is reflected in the seeding tables located in database(s) 102. Screen 703 also allows for the updating of the individual's seeding information, which is stored as client information in databases(s) 102.

Screen 705 of FIG. 7B allows for the user to select a member to be seeded for the next run of the extract process (i.e., the process by which the identification cards are generated). In order to seed a particular piece of structure, the user identifies the member to be seeded by inputting the account, branch, benefit option and, possibly, the network. The user then inputs the member to seed in member to seed box 713. Finally, the user inputs a code indicating the reason why the member needs a new identification card or collateral. In order to change a member that is already seeded for a piece of structure, the user follows the same initial steps except that, if the particular structure has a member seeded against it, the member will be shown in the member to seed box 713. The user may then select a different member, and then input the identification card/collateral reason code as appropriate. The information inputted at screen 705 will be used to update seeding tables in database(s) 102.

Screen 707, shown in FIG. 7C, allows a user to view all members who are currently seeded for the next run of the extract process and also allows the user to remove a member from the list. Any information removed will be reflected in the seeding tables of database(s) 102.

The preferred embodiment of the identification card/ collateral extract process includes extracting identification card information from database(s) 102 and merging that information with card formatting data to be sent to the vendor to produce the identification cards. In particular, in the first step of the process, eligibility information is obtained for all members seeded for identification cards/ collateral. The extracted data is stored in a sequential file. The records identified in the first step are then sorted by account number, branch number, benefits option, network and "as of" date (i.e. the date a certain piece of data becomes effective) to allow for ease of access to the client information in database(s) 102 during the next step in the process.

Using the sorted file from the previous step, the client information is accessed to obtain structure data and hold/ release information. The business rules are obtained from database(s) 102 and applied to the members to qualify them for an identification card and/or collateral. Upon filtering each extracted member through the business rules and hold/release information, if any record does not meet the conditions, that record is added to a separate file and the input record is flagged. Records that meet the conditions are added to a valid output file.

Then, using the valid output file, benefits information for each record is obtained. Using the information in the output file (now an input file), benefits information (e.g., copay information) is returned and added to the record. If benefits information is not found, the input record is flagged and a record is written to a fallout file. If the input record is for collateral only, the benefits are not retrieved and the record is bypassed without processing. Next, the records are sorted by network and provider enrollment number. After this sorting procedure, the provider data is obtained. The effective and cancel dates for each provider is compared with rules relating to when an identification card will be generated in light of a particular effective or cancellation date. Provider data is added to each of the successful records and failed records are written to a fallout file.

The output file from the previous step (in which provider data is added) is used as an input to the step in which copay printing, state compliance and seeding are completed. Seeding information, copay printing information, state rules and any remaining data needed to produce the ID card is obtained from database(s) 102. If a record does not meet all the criteria of the rules, the record is written to a fallout file. Successful records are written to an output file. The output file is then merged with the associated template data to produce the identification card data file.

Records that were written to an output file as a result of failing to satisfy certain business rules are merged, sorted and used to update an error tracking table. Records that were previously unsuccessful but for which identification cards were later successfully generated are removed from the error tracking table.

Figure 8:
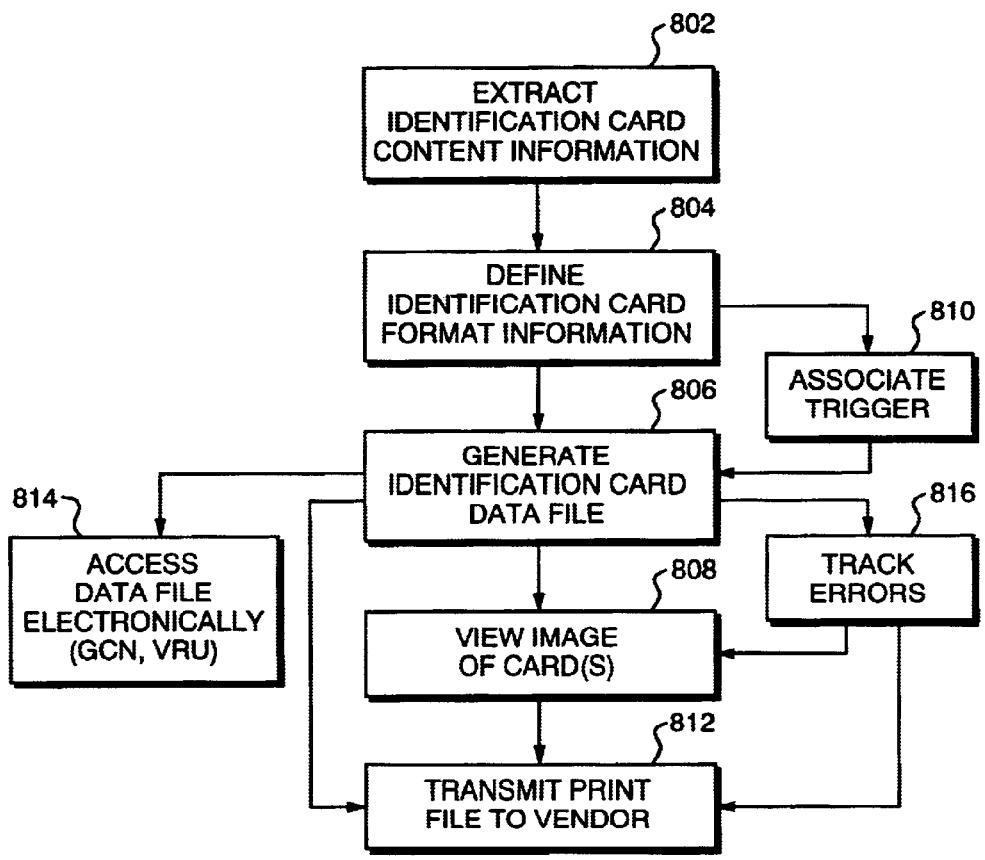
FIG. 8 illustrates a flow chart of a preferred embodiment of a method for generating an identification card documentation data file in accordance with a preferred embodiment of the present invention.

With reference to FIG. 8, a method for generating an identification card documentation data file representative of a high volume batch of identification card documentation items is illustrated. In step 802, identification card documentation format information, that corresponds to positioning of identification card documentation content information on each of the identification card documentation items in the batch, is defined. In step 804, the identification card documentation content information is extracted from one or more databases comprising provider information, eligibility information, client information, benefits information and business rules. In step 806, the identification card documentation data file is generated based on the identification card documentation content information and the identification card documentation format information. In some embodiments, in step 816, errors occurring during the performance of step 806 are tracked.

In some embodiments, in step 810, a trigger is associated with the identification card documentation content information and steps 804 and 806 are performed upon activation of the trigger. In other embodiments, in step 808, an image of at least one of the identification card documentation items in the data file is viewed. In step 812, in other embodiments, a print file, comprising data contained in said identification card documentation data file, is transmitted to a vendor for printing at least one of the identification card documentation items in the batch. In still other embodiments, in step 814, at least one of the of the identification card documentation items in the data file via a computer network or via a voice response unit.

The foregoing description has been directed to specific embodiments of this invention. It will be apparent, however, that other variations and modifications may be made to the described embodiments, with the attainment of some or all of their advantages.

We claim:

1. A method for generating an identification card documentation data file representative of a high volume batch of identification card documentation items comprising the steps of:

(A) defining identification card documentation format information that corresponds to positioning of identification card documentation content information on each said identification card documentation items in said batch;

(B) extracting the identification card documentation content information from one or more databases comprising provider information, eligibility information, client information, benefits information and business rules; and (C) generating the identification card documentation data file based on said identification card documentation content information and said identification card documentation format information.

2. The method of claim 1 wherein said identification card documentation items comprise identification cards.

3. The method of claim 1 wherein said identification card documentation items comprise collateral.

4. The method of claim 1 further comprising step of:

(D) viewing an image of at least one of said identification card documentation items in the data file.

5. The method of claim 1 further comprising the step of:

(D) associating a trigger with said identification card documentation content information and performing steps (B) and (C) upon activation of said trigger.

6. The method of claim 1 further comprising the step of:

(D) transmitting a print file, comprising data contained in said identification card documentation data file, to a vendor for printing at least one of said identification card documentation items in said batch.

7. The method of claim 2 wherein at least one of said identification cards comprises a magnetic strip.

8. The method of claim 1 further comprising the step of:

(D) accessing at least one of said identification card documentation items in the data file via a computer network.

9. The method of claim 1 further comprising the step of:

(D) accessing at least one of said identification card documentation items in the data file via a voice response unit.

10. The method of claim 1 further comprising the step of:

(D) tracking one or more errors occurring during step (C).

11. The method of claim 1 wherein said identification card documentation items relate to health care benefits coverage.

12. The method of claim 1 wherein said identification card documentation items relate to dental benefits coverage.

13. The method of claim 1 wherein said business rules are determined by a steering committee.

14. A system for generating an identification card documentation data file representative of a high volume batch of identification card documentation items comprising:

one or more databases comprising provider information, eligibility information, client information, benefits information and business rules; and one or more processors that extract identification card documentation content information from said one or more databases; define identification card documentation format information that corresponds to positioning of the identification card documentation content information on each of said identification card documentation items in said batch; and generate the identification card documentation data file based on said identification card documentation content information and said identification card documentation format information.

15. The system of claim 14 wherein said identification card documentation items comprise identification cards.

16. The system of claim 14 wherein said identification card documentation items comprise collateral.

17. The system of claim 14 further comprising:

a display screen for viewing an image of at least one of said identification card documentation items in said data file.

18. The system of claim 14 wherein said one or more processors further associate a trigger with said identification card documentation content information and extract the identification card documentation content information from said one or more databases and generate said identification card documentation data file upon activation of said trigger.

19. The system of claim 14 wherein said one or more processors further transmit a print file, comprising data contained in said identification card documentation data file, to a vendor for printing at least one of said identification card documentation items in each batch.

20. The system of claim 15 wherein at least one of said identification cards comprises a magnetic strip.

21. The system of claim 14 further comprising:

a client machine for accessing at least one of said identification card documentation items in the data file via a computer network.

22. The system of claim 14 further comprising:

a voice response unit for accessing at least one of said identification card documentation items in the data file.

23. The system of claim 14 wherein said one or more processors further track one or more errors occurring while generating said identification card documentation data file.

24. The system of claim 14 wherein said identification card documentation items relate to health care benefits coverage.

25. The system of claim 14 wherein said identification card documentation items relate to dental benefits coverage.

26. The system of claim 14 wherein said business rules are determined by a steering committee.

* * * * *